(12) United States Patent
Ou et al.

(10) Patent No.: US 9,664,210 B2
(45) Date of Patent: May 30, 2017

(54) METHODS AND APPARATUS FOR LAYER JAMMING

(71) Applicants: Jifei Ou, Cambridge, MA (US); Lining Yao, Cambridge, MA (US); Daniel Tauber, Edling (DE); Hiroshi Ishii, Cambridge, MA (US)

(72) Inventors: Jifei Ou, Cambridge, MA (US); Lining Yao, Cambridge, MA (US); Daniel Tauber, Edling (DE); Hiroshi Ishii, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 450 days.

(21) Appl. No.: 14/516,039

(22) Filed: Oct. 16, 2014

(65) Prior Publication Data

US 2015/0107233 A1 Apr. 23, 2015

Related U.S. Application Data

(60) Provisional application No. 61/893,212, filed on Oct. 19, 2013.

(51) Int. Cl.
| | |
|---|---|
| *F15B 9/16* | (2006.01) |
| *F15B 15/10* | (2006.01) |
| *F16J 3/02* | (2006.01) |

(52) U.S. Cl.
CPC ............... *F15B 15/10* (2013.01); *F16J 3/02* (2013.01); *F15B 2211/705* (2013.01);
(Continued)

(58) Field of Classification Search
CPC ....... F15B 15/10; F15B 2211/7107; F16J 3/02
See application file for complete search history.

(56) References Cited

U.S. PATENT DOCUMENTS

| | | | |
|---|---|---|---|
| 6,796,940 B2 * | 9/2004 | Bonadio ................ | A61B 17/02 600/206 |
| 2012/0280421 A1 | 11/2012 | Keating et al. | |

(Continued)

OTHER PUBLICATIONS

Cheng, N., et al., 2012, Design and analysis of a robust, low-cost, highly articulated manipulator enabled by jamming of granular media. 2012 IEEE International Conference on Robotics and Automation (ICRA), pp. 4328-4333, IEEE 2012.

(Continued)

*Primary Examiner* — Michael Leslie
(74) *Attorney, Agent, or Firm* — Stephen R. Otis

(57) ABSTRACT

In some implementations, bending or other shape changes of a device are actuated by inflating or deflating a bladder in the device. Then, once the desired new shape is achieved by this actuation, another bladder in the device is layer-jammed, to make the device rigid in the new shape. In some cases, sheets in the layer-jamming bladder are coated with abrasive particles. In some cases, layer jamming bladders are interwoven to form a woven device. The rigidity of the woven device can be anisotropically controlled. Layer jamming some, but not all, of the bladders in the woven device causes the woven device to have a rigidity that varies by direction. In some cases, a layer-jamming bladder includes a solid layer with a crease in it. As a result, the bladder can easily bend at the crease.

20 Claims, 20 Drawing Sheets

(52) U.S. Cl.
CPC ... *F15B 2211/7107* (2013.01); *F15B 2211/78* (2013.01); *F15B 2211/89* (2013.01)

(56) References Cited

U.S. PATENT DOCUMENTS

| | | |
|---|---|---|
| 2012/0310126 A1 | 12/2012 | Bureau et al. |
| 2013/0275082 A1 | 10/2013 | Follmer et al. |
| 2014/0314976 A1 | 10/2014 | Niiyama et al. |
| 2015/0369325 A1 | 12/2015 | Bureau et al. |

OTHER PUBLICATIONS

Follmer, S., et al., 2012, Jamming user interfaces: programmable particle stiffness and sensing for malleable and shape-changing devices, Proceedings of the 25th annual ACM symposium on User interface software and technology (UIST '12).

Holman, D. et al., 2008, Organic user interfaces: designing computers in any way, shape, or form. Communications of the ACM—Organic user interfaces, vol. 51 Issue 6, Jun. 2008, pp. 48-55, ACM New York, NY, USA.

Kim, Y., et al., 2012, Design of a tubular snake-like manipulator with stiffening capability by layer jamming. 2012 IEEE/RSJ International Conference on Intelligent Robots and Systems (IROS), pp. 4251-4256, IEEE, 2012.

Kim, Y., et al., 2013, A Novel Layer Jamming Mechanism With Tunable Stiffness Capability for Minimally Invasive Surgery. IEEE Transactions on Robotics, vol. 29 Issue 4, pp. 1031-1042, IEEE, Aug. 2013.

Shepherd, R., et al., 2011, Multigait soft robot, Proceedings of the National Academy of Sciences of the United States of America (PNAS), Dec. 20, 2011; 108(51):20400.

\* cited by examiner

METHODS AND APPARATUS FOR LAYER JAMMING

RELATED APPLICATIONS

This application is a non-provisional of, and claims the benefit of the filing date of, U.S. Provisional Patent Application No. 61/893,212, filed Oct. 19, 2014, the entire disclosure of which is herein incorporated by reference.

FIELD OF THE TECHNOLOGY

The present invention relates generally to layer jamming.

SUMMARY

In exemplary implementations of this invention, layer jamming is used to control the rigidity of a device. The device includes at least one bladder for layer jamming. The layer-jammable bladder encloses a cavity. Inside the cavity are a fluid and flexible sheets. The sheets are positioned one on top of the other, such that each sheet is adjacent to at least one other sheet. In some cases, the sheets are at least partially immersed in the fluid.

The rigidity of the sheets (and of the bladder in which they are contained) is controlled by layer jamming, as follows. In order to increase the rigidity of the sheets, fluid is evacuated from the cavity. External atmospheric pressure is transmitted though the cavity walls, compressing the sheets against each other, thereby increasing friction between the sheets. This increased friction increases the rigidity of the sheets, because, among other things, it prevents the sheets from shearing past each other.

The layer jamming process is reversible. In order to make the sheets more flexible (less rigid), fluid is pumped back into the cavity. The fluidic pressure of the fluid in the cavity presses against the cavity walls from the inside of the cavity, and thus opposes the external atmospheric pressure pressing against the cavity walls. The compression of the sheets decreases, so that the sheets are no longer tightly pressed against each other and friction between the sheets decreases. This decreased friction reduces the rigidity of the sheets, because, among other things, it allows the sheets to shear past each other.

In some implementations, abrasive particles are bonded to the surfaces of the sheets. Advantageously, these coated abrasive sheets have a high coefficient of friction when pressed together, and thus are well suited for forming rigid structures by layer jamming.

In some implementations, layer-jamming bladders are interwoven to form a woven device. The rigidity of the woven device can be anisotropically controlled. Layer jamming some, but not all, of the bladders in the woven device causes the woven device to have a rigidity that varies by direction. For example, in some cases, if parallel bladders in the woven device are layer jammed, and the other bladders that are oriented in other directions in the woven device are not layer jammed, then: (a) the device will tend to be most flexible along the spaces between the parallel, layer jammed bladders; (b) the device can be easily bent about an axis that is parallel with the longitudinal axes of these layer jammed bladders; and (c) the device will tend to be most rigid along a direction that is perpendicular to those layer jammed bladders. The intersections of woven bladders are not necessarily at right angles. Any angle of intersection can be used. For example, in some cases, bladders are interwoven at angles of 90 degrees, 60 degrees, 45 degrees, 30 degrees or some other angle. In some cases, the interwoven bladders comprise two or more sets of bladders, where each set of bladders, respectively, has a single, common cavity.

In some implementations, a layer-jammable bladder includes a solid layer with a crease in it. As a result, the bladder can easily bend at the crease. Once the bladder has been bent to a desired angle at the crease, it is layer jammed to make it rigidly bent at the desired angle. Thus, advantageously, sheets can be bent at the crease to any desired angle within a range of angles, and then layer jamming can be used to "solidify" the sheets at the desired angle.

Here is an example. Start with a bladder that has a crease and is layer jammed. Pump air into the bladder, to "unjam" (reverse layer jam) the bladder, and thus to make the bladder flexible. Then bend the bladder at the crease, until the bladder reaches a desired angle. Then layer jam the bladder, to make it rigid at the desired angle. This process can be reversed, by pumping air into the bladder, thereby unjamming the bladder, so that it is flexible and can be bent back into the original, flat shape.

In some implementations, bending or other shape changes of a device are actuated by inflating or deflating an actuation bladder in the device. Then, once the desired bending or other shape is achieved by this actuation: (1) another bladder in the device is layer-jammed, to make the device rigid in this new shape, and (2) the actuation bladder is deflated, to return the bladder to a thin form factor. In some cases, multiple actuation chambers and multiple layer jamming bladders are included in a single device. These can be used, in different combinations and different sequences, in order to control the shape and rigidity of the device in complex patterns.

The description of the present invention in the Summary and Abstract sections hereof is just a summary. It is intended only to give a general introduction to some illustrative implementations of this invention. It does not describe all of the details of this invention. This invention may be implemented in many other ways. Likewise, the description of this invention in the Field of the Technology section is not limiting; instead it identifies, in a general, non-exclusive manner, a field of technology to which exemplary implementations of this invention generally relate.

The above Figures show some illustrative implementations of this invention, or provide information that relates to those implementations. However, this invention may be implemented in many other ways.

DETAILED DESCRIPTION

FIGS. 1A to 1E show examples of layer jamming.

Figure 1A:
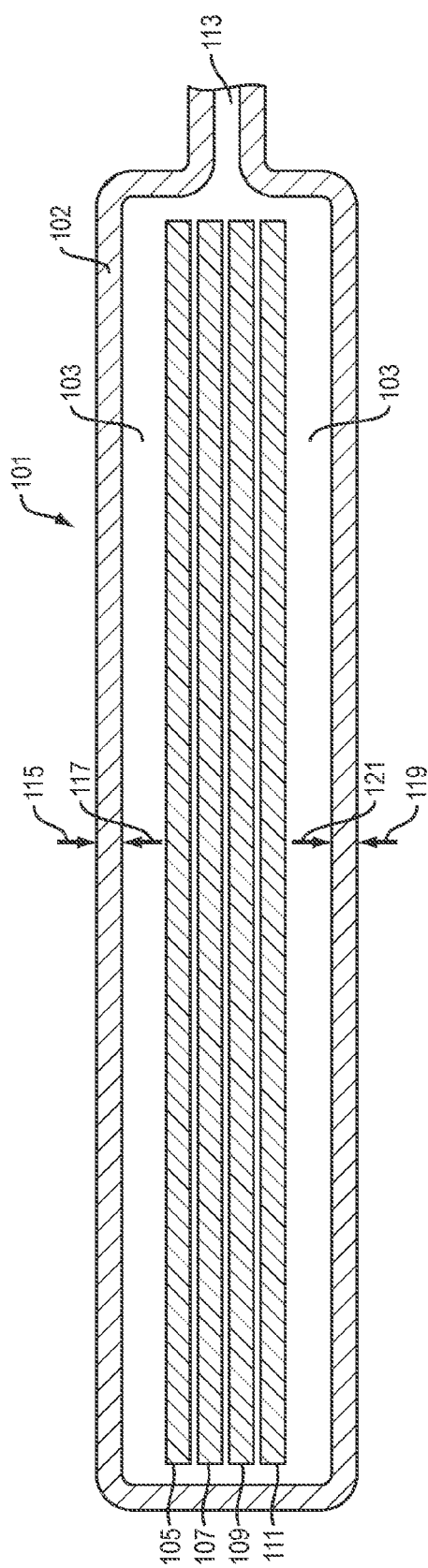
FIGS. 1A, 1B, 1C, 1D and 1E show examples of layer jamming.

In FIG. 1A, a bladder 101 with flexible walls encloses a cavity. The cavity contains a fluid 103 and flexible, solid sheets (e.g., 105, 107, 109, 111). A hole in the wall 102 of the bladder connects the cavity inside the bladder with a tube 113 external to the bladder. The tube 113 connects to a pump system. The pump system is used to pump fluid into or out of the cavity, and thereby to control the pressure of the fluid 103 in the cavity.

In the example shown in FIG. 1A, external atmospheric pressure (represented by arrows 115, 119) is opposed by the fluidic pressure inside the cavity (represented by arrows 117, 121). The sheets are not pressed tightly against each other.

Figure 1B:
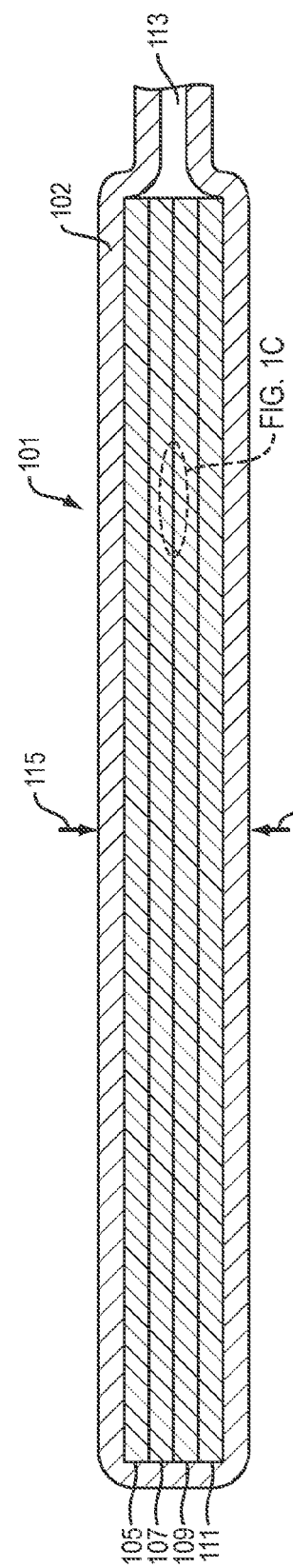

In the example shown in FIG. 1B, all or a portion of the fluid 103 has been evacuated from the cavity. External atmospheric pressure (represented by arrows 115 and 119) presses the wall 102 of the bladder 101 tightly against the sheets. As a result, these sheets are compressed against each other, increasing friction between the sheets.

In illustrative implementations of this invention, each sheet comprises a substrate layer that is coated with abrasive particles that are bonded to the substrate layer by an adhesive. For example: (a) in some cases, the substrate layer comprises paper, polymer impregnated paper, fibre, vulcanized fiber, cotton, polyester, rayon, or PET (polyethylene terephthalate) film; (b) in some cases the abrasive particles comprise aluminum oxide, ceramic aluminum oxide, silicon carbide, aluminum oxide-zirconium oxide alloy, chromium III oxide, emery, garnet, or flint; (c) in some cases, the adhesive comprises a resin bond; (d) in some cases, the abrasive particles are tightly packed and contiguous to each other on the surface of the substrate; and (e) in some cases, the abrasive particles are open coat, that is, separated from each other on the surface of the substrate. Also, for example, in some cases the sheets comprise emery cloth, emery paper or so-called "sandpaper".

Figure 1C:
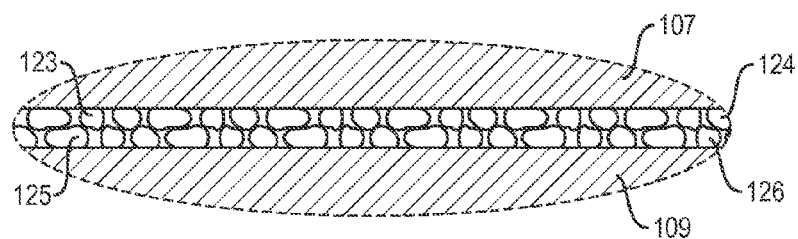

FIG. 1C shows a detailed view of a part of the region where sheets 107 and 109 are compressed against each other in FIG. 1B. In the example shown in FIG. 1C, sheets 107 and 109 are each coated with abrasive particles. Abrasive particles (e.g., 123, 124) are attached to sheet 107 by an adhesive. Other abrasive particles (e.g., 125, 126) are attached to sheet 109 by an adhesive. The abrasive particles in the two sheets are pressed against other, thereby increasing friction between sheets 107 and 109.

Figure 1D:
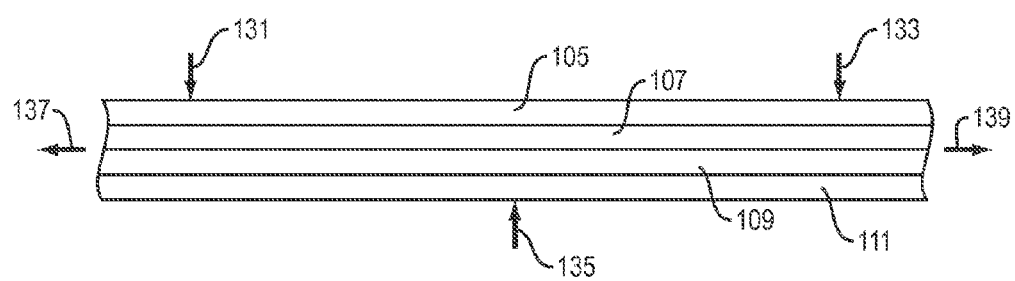
Figure 1E:
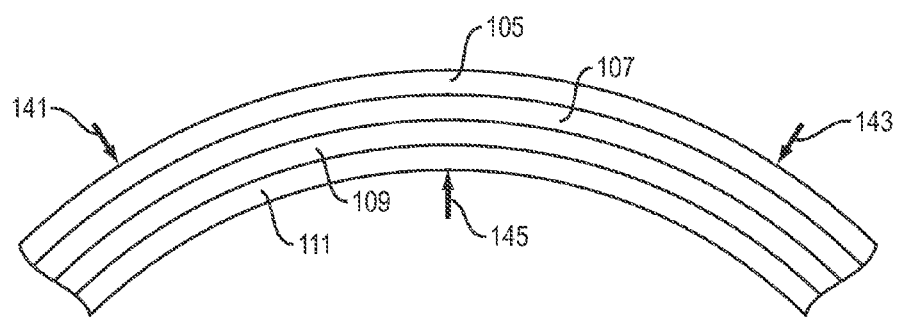

In FIGS. 1D and 1E, the sheets are layer-jammed. As in FIG. 1B, the fluid in the cavity has been evacuated and the sheets (e.g., 105, 107, 109, 111) in the cavity are being compressed against each other due to external (e.g., atmospheric) pressure (not shown) that is being transmitted through the flexible cavity walls (not shown). Because the sheets are pressed tightly together, friction between the sheets increases, thereby increasing the rigidity and tensile strength of the set of sheets.

In the example shown in FIG. 1D, sheets 105, 107, 109, 111 have previously been layer-jammed in a straight shape. While in that straight shape, the sheets are being subjected to perpendicular (bending) forces (represented by arrows 131, 133, 135) and tension forces (represented by arrows 137, 139). These forces are less than that required to cause failure (inelastic deformation or ripping) of the sheets.

In order for the sheets in FIG. 1D to bend in response to the applied bending forces (131, 133, 135), the sheets need to stretch or to shear past other. The sheets, however, have a high enough Young's modulus that the sheets do not substantially stretch in response to the forces. Nor can the sheets shear past each other, because the sheets are compressed against each other by the layer jamming, thereby greatly increasing friction between the sheets. Thus, in FIG. 1D, the layer jammed sheets are rigidly stiff, and do not bend substantially in response to the bending forces.

Likewise, in FIG. 1D, in order for the sheets in FIG. 1D to elongate in response to the tension forces (137, 139), the sheets need to shear past each other or to stretch. This does not happen, for the reasons described above.

In the example shown in FIG. 1E, sheets 105, 107, 109, 111 have previously been layer-jammed in a bent shape. Thus, they are in a rigid, bent shape. While in that rigid, bent shape, the sheets are being subjected to perpendicular (bending) forces (represented by arrows 141, 143, 145). These forces are less than that required to cause failure (inelastic deformation or ripping) of the sheets.

In order for the sheets in FIG. 1E to change their angle of bending in response to the bending forces (141, 143, 145), the sheets need to stretch or to shear past each other. Again, this does not happen, for the reasons described above.

FIGS. 1A-1E show four sheets (105, 107, 109, 111). However, in practice, the number of sheets may be any number greater than one, including two, three, four, five, six, seven, eight, nine, ten, or more.

Figure 2A:
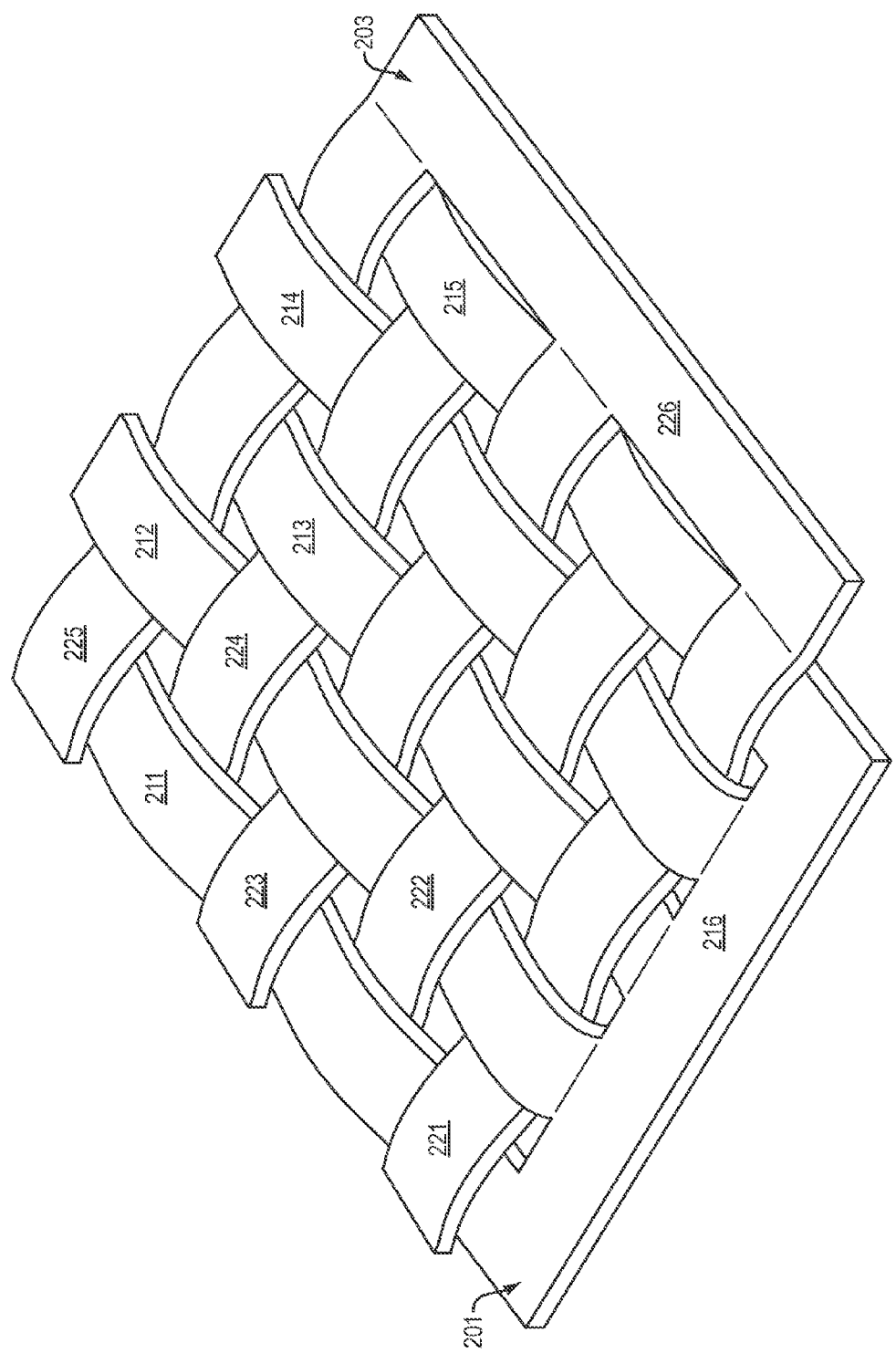
FIGS. 2A and 2B show a perspective and bottom view, respectively, of a woven device that comprises interwoven layer-jammable bladders.
Figure 2B:
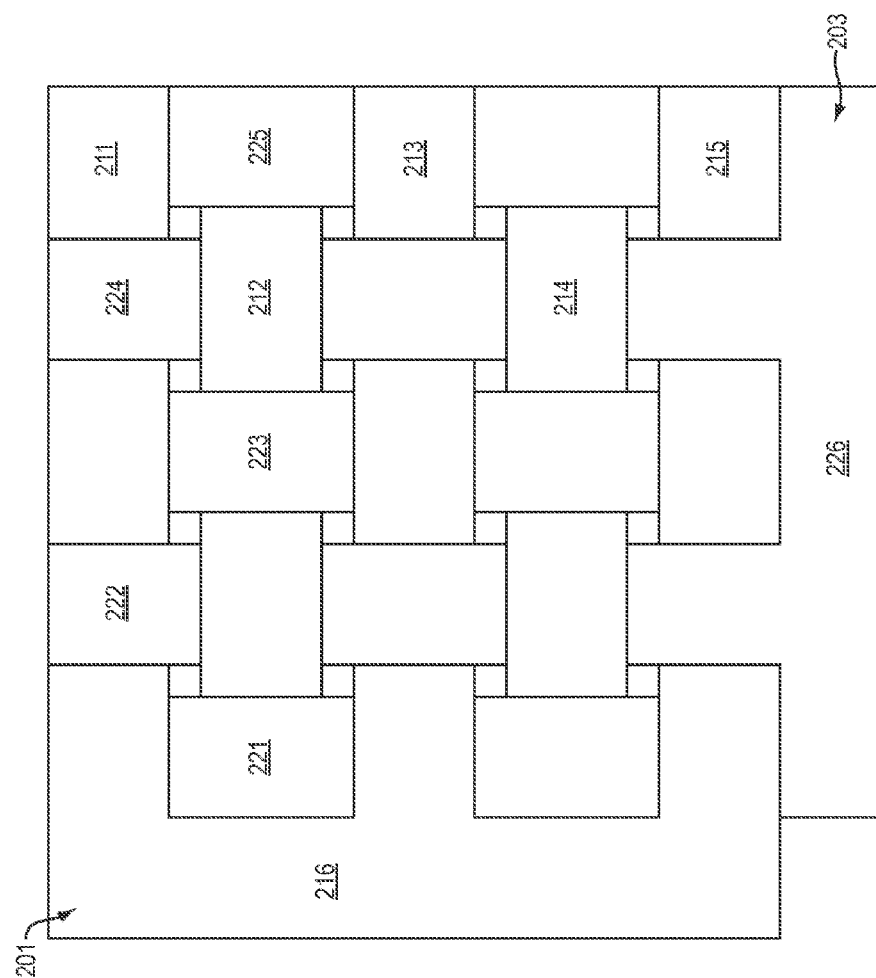

In illustrative implementations, two or more sets of bladders are interwoven with each other. FIG. 2A shows a perspective view (from a perspective above and off to the side) of two sets of interwoven bladders. FIG. 2B shows a bottom view of these two sets of interwoven bladders.

In FIGS. 2A and 2B, a first set of bladders 201 comprises six bladders: five elongated bladders (211, 212, 213, 214, 215) that are aligned substantially parallel to each other and a sixth elongated bladder 216 that is aligned substantially perpendicular to these five bladders. The first set of bladders together form a single integral structure and share a single, fluidically connected cavity among them, such that a portion of the cavity is in each of the six bladders in the first set of bladders.

Likewise, in FIGS. 2A and 2B, a second set of bladders 203 comprises six bladders: five elongated bladders (221, 222, 223, 224, 225) that are aligned substantially parallel to each other and a sixth elongated bladder 226 that is aligned substantially perpendicular to these five bladders. The second set of bladders together form a single integral structure and share a single, fluidically connected cavity among them, such that a portion of the cavity is in each of the six bladders in the second set of bladders.

In FIGS. 2A and 2B, the first and second sets of bladders are interwoven with each other. For example, bladder 213 goes under bladder 221, over bladder 222, under bladder 223, over bladder 224, and under bladder 225. Also, for example, bladder 224 goes under bladder 211, over bladder 212, under bladder 213, over bladder 214, and under bladder 215.

Figure 3:
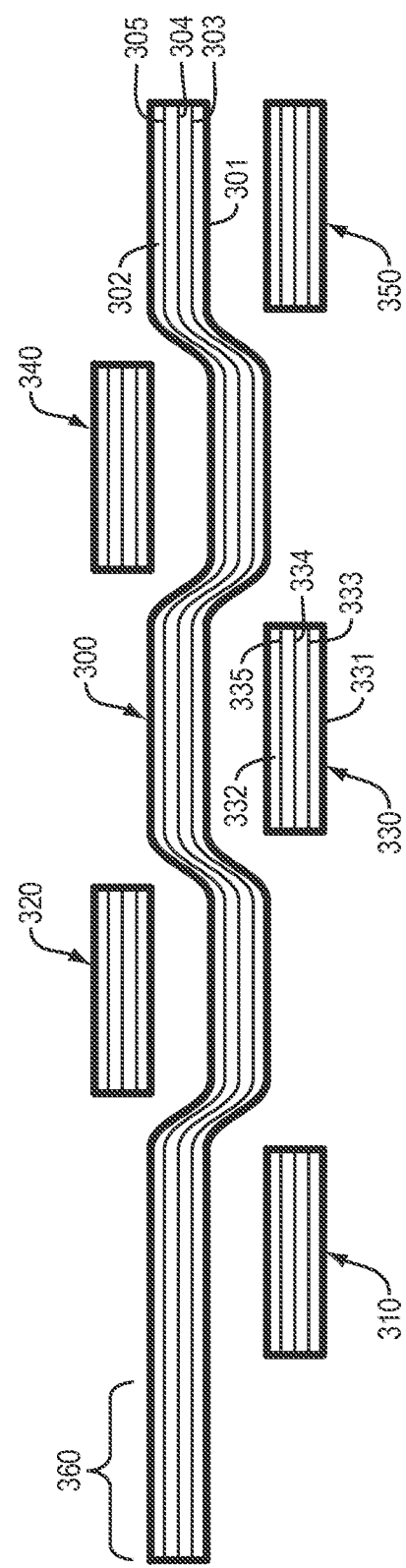
FIG. 3 shows a cross-section of the woven device.

FIG. 3 is a cross-sectional view of interwoven bladders. In the example shown in FIG. 3, bladder 300 is part of a first set of bladders and bladders 310, 320, 330, 340, 350 are part of a second set of bladders. Bladder 300 goes over bladder 310, under bladder 320, over bladder 330, under bladder 340, and over bladder 350. Region 360 is part of, or connects to, another bladder that is substantially perpendicular to bladder 300.

In the example shown in FIG. 3, each bladder is layer-jammable. Each bladder in FIG. 3 comprises a bladder wall that contains a cavity. Inside the cavity are a fluid and flexible sheets. The sheets are at least partially immersed in the fluid. For example, bladder 300 comprises a bladder wall 301 that encloses a cavity 302. Inside cavity 302 are fluid and sheets 303, 304, 305. Also, for example, bladder 330 comprises a bladder wall 331 that encloses a cavity 332. Inside cavity 332 are fluid and sheets 333, 334, 335.

In some implementations, the fluid inside the bladders comprises a gas, such as air. In some other implementations, the fluid inside the bladders comprises a liquid.

Figure 4:
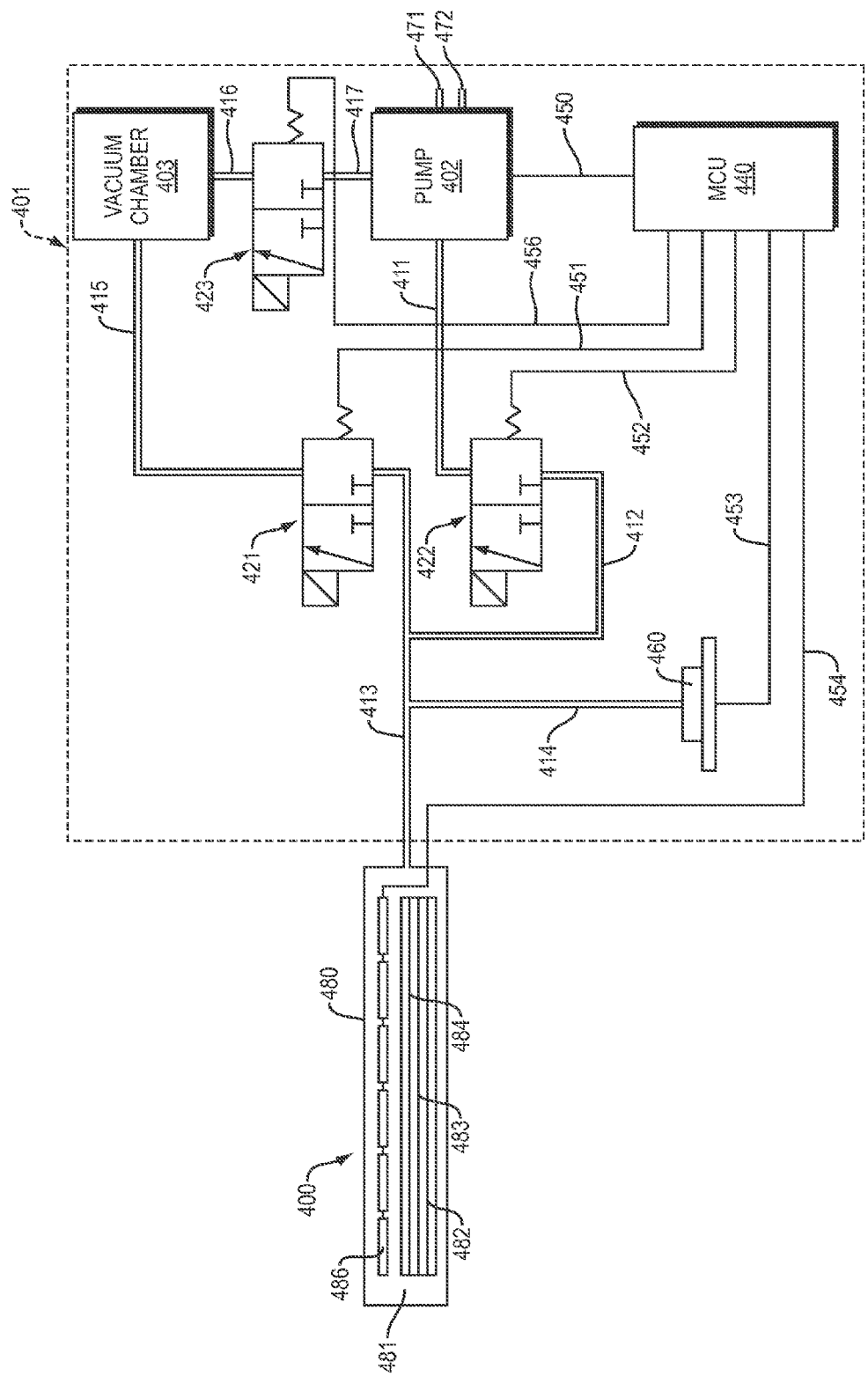
FIG. 4 shows a layer jamming system, in which the jamming fluid is a gas.

In the example shown in FIG. 4, the fluid comprises air.

In the example shown in FIG. 4, a pump system 401 controls the pressure of air in a layer-jammable bladder 400. The pump system 401 comprises a pump 402, pneumatic valves 421, 422, 423, tubes 411, 412, 413, 414, 415, 416, 417, a vacuum chamber 403, a pressure sensor 460, a microcontroller 440, and wires 450, 451, 452, 453, 454, 456. To inflate the bladder 400, valve 421 is shut, valve 422 is open, and the pump pumps air through tubes 411, 412 and 413 into the bladder 400. To deflate the bladder 400, valve 421 is shut, valve 422 is open, and the pump 402 pulls air through tubes 411, 412 and 413 out of the bladder 400. Alternatively, the bladder is deflated quickly by shutting valve 422 and opening valve 421, so that air rushes out of the bladder 400 through tubes 413 and 415 into the vacuum chamber 403. To create a vacuum in the vacuum chamber 403, valve 421 is shut, valve 423 is open, and air is evacuated out of the vacuum chamber 403 through tubes 416, 417 by the pump 402. The pump has at least one port (e.g., 471) through which air is drawn into the pump from the external atmosphere, and at least one other port (e.g., 472) through which air is pumped out of the pump into the external atmosphere.

In the example shown in FIG. 4, the pressure sensor 460 is fluidically connected to the bladder 400 via tubes 413, 414 and thus can detect the air pressure inside the bladder 400. The microcontroller 440 is connected via wire 450 to the pump 402, via wires 451, 452, 456 to valves 421, 422, 423, respectively, and via wire 453 to pressure sensor 460. Data is transferred over these wires to or from the microcontroller 440. For example, the microcontroller sends signals to control the pump and valves and, in some cases, receives data that is indicative of the pump state and valve state. Also, for example, the microcontroller receives pressure data from the pressure sensor.

Figure 5:
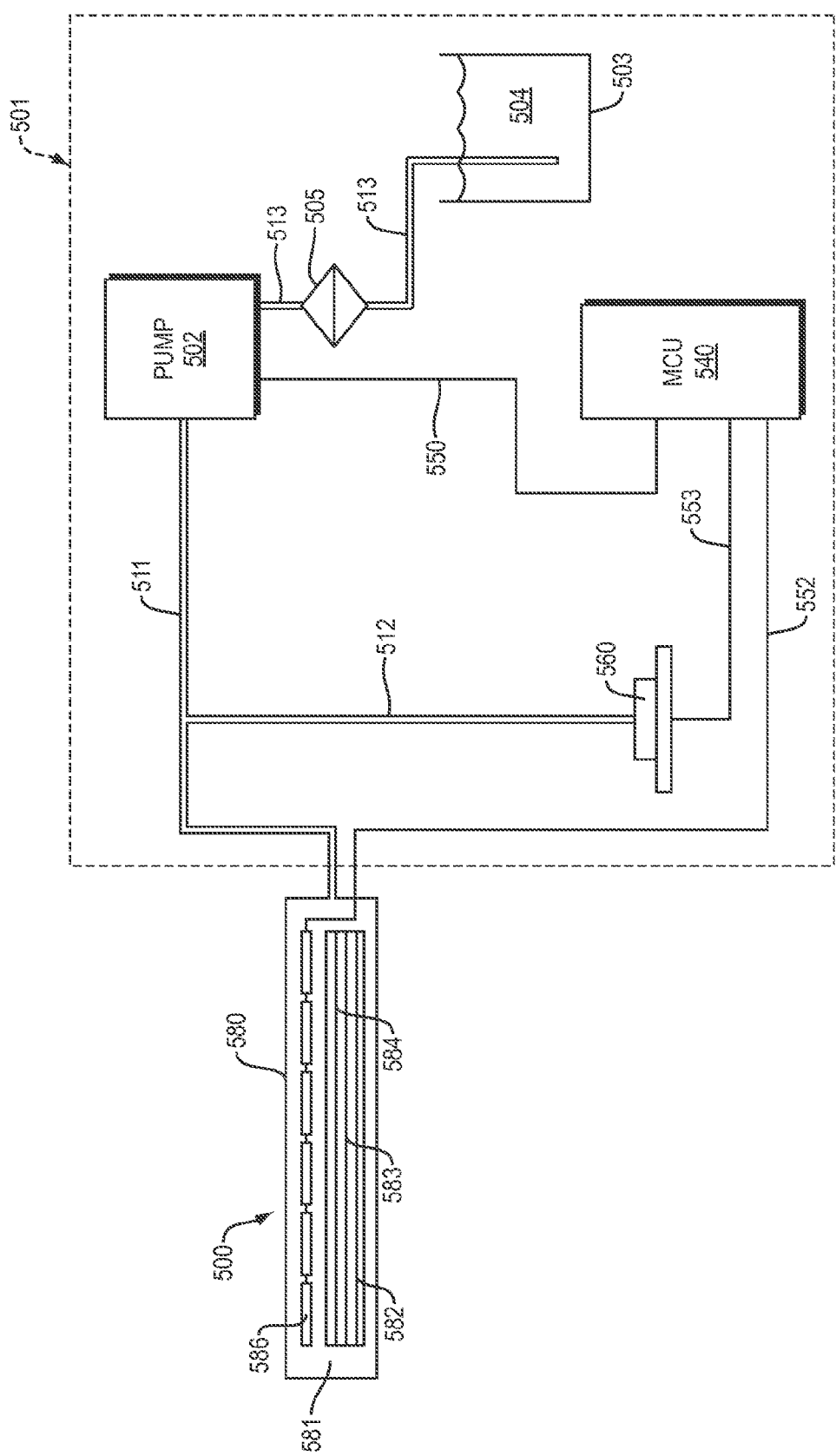
FIG. 5 shows a layer jamming system, in which the jamming fluid is a liquid.

In the example shown in FIG. 5, the fluid comprises a liquid, such as water or oil.

In the example shown in FIG. 5, a pump system 501 controls the pressure of liquid in a layer jamming bladder 500. The pump system 501 comprises a pump 502, a reservoir 503 for storing liquid 504, a filter 505, tubes 511, 512, 513, a pressure sensor 560, a microcontroller 540, and wires 550, 552, 553. In some cases, the pump 502 is a gear pump. To inflate the bladder 500, the pump 502 draws liquid from the reservoir 503 through tube 513 and pumps the liquid through tube 511 into the bladder 500. To deflate the bladder 500, the pump 502 pulls liquid through tube 511 out of the bladder 500 and pumps liquid through tube 513 into the reservoir 503.

In the example shown in FIG. 5, the pressure sensor 560 is fluidically connected to the bladder 500 via tubes 511, 512 and thus can detect the pressure of liquid inside the bladder 500. The microcontroller 540 is connected via wire 550 to the pump 502, and via wire 553 to pressure sensor 560. Data is transferred over these wires to or from the microcontroller 540. For example, the microcontroller sends signals to control the pump and, in some cases, receives data indicative of the pump state. Also, for example, the microcontroller receives pressure data from the pressure sensor.

In FIGS. 4 and 5, only one bladder is shown. Other bladders, if any, that are connected to the pump system (401 or 501) are not shown.

In the examples shown in FIGS. 4 and 5, the wall 480, 580 of the bladder 400, 500 encloses a cavity 481, 581. The cavity 481, 581 contains a fluid and flexible sheets (sheets 482, 483, 484 in FIG. 4, and sheets 582, 583, 584 in FIG. 5). In FIGS. 4 and 5, each sheet is adjacent to at least one other sheet. Electrodes 486, 586 are located inside the cavity 481, 581 (or alternately, in the cavity wall 480, 580 itself). The electrodes 486, 586 operate as a bend sensor. The bend sensor detects when the bladder is bent or pressed (e.g., by a human manipulating the bladder). Data from the electrodes 486, 586 is sent via wire 454, 552 to the microcontroller 440, 540.

In some cases, a bend sensor comprises a layer of copper tape, a layer of Velostat®, and another layer of copper tape. The greater the bending of, or pressure against, the bend sensor, the lower the resistance of the bend sensor. The bend sensor is positioned in a region (e.g., in or adjacent to a bladder) where pressure or bending detection is needed.

Figure 6:
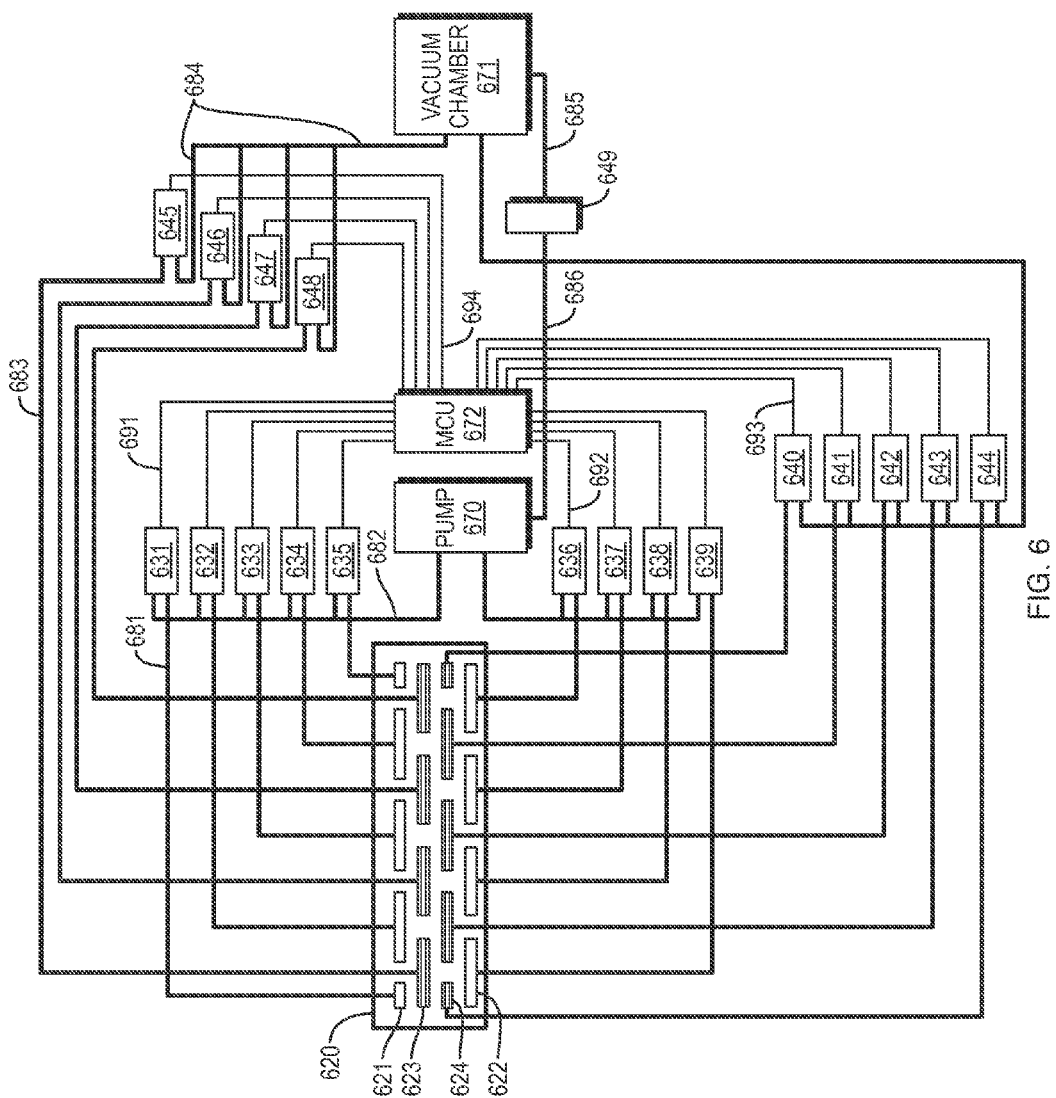
FIG. 6 shows a device that includes both (a) actuation bladders for controlling the shape of the device, and (b) layer-jamming bladders for controlling rigidity of the device.

In the example shown in FIG. 6, an outer bladder 620 encloses eighteen inner bladders. Nine of the inner bladders (e.g., 623, 624) are configured for layer jamming: each such bladder contains flexible sheets that become rigid when air is evacuated from such bladder. These layer-jamming bladders are shown with multiple lines inside of them, representing the sheets used for layer jamming. The other nine inner bladders (e.g., 621, 622) are actuation bladders. These actuation bladders are inflatable and thus change size when air is pumped into or out of them, but do not contain sheets and are not configured for layer jamming.

In the example shown in FIG. 6, the pump system includes a pneumatic pump 670, a vacuum chamber 671, tubes (represented by dark lines, such as 681, 682, 683, 684, 685, 686), valves (631-649), a microcontroller 672, and wires (represented by lighter lines, such as 691, 692, 693, 694). Similar to FIG. 4, each respective inner bladder is inflated or deflated by opening and shutting appropriate valves and pumping air into or out the respective bladder. For example, in order to inflate or deflate inner bladder 621, valve 631 is open, and the pump 670 pumps air through tubes 681 and 682 into (for inflation) or out of (for deflation) bladder 621. Also, for example, in order to quickly deflate bladder 623, valve 645 is opened, and air rushes out of bladder 623 through tubes 683, 684 into vacuum chamber 671. To create a vacuum in the vacuum chamber 671, valve 649 is open, valves 640-648 are shut, and air is evacuated out of the vacuum chamber 671 by the pump 670 through tubes 685, 686.

Figure 7:
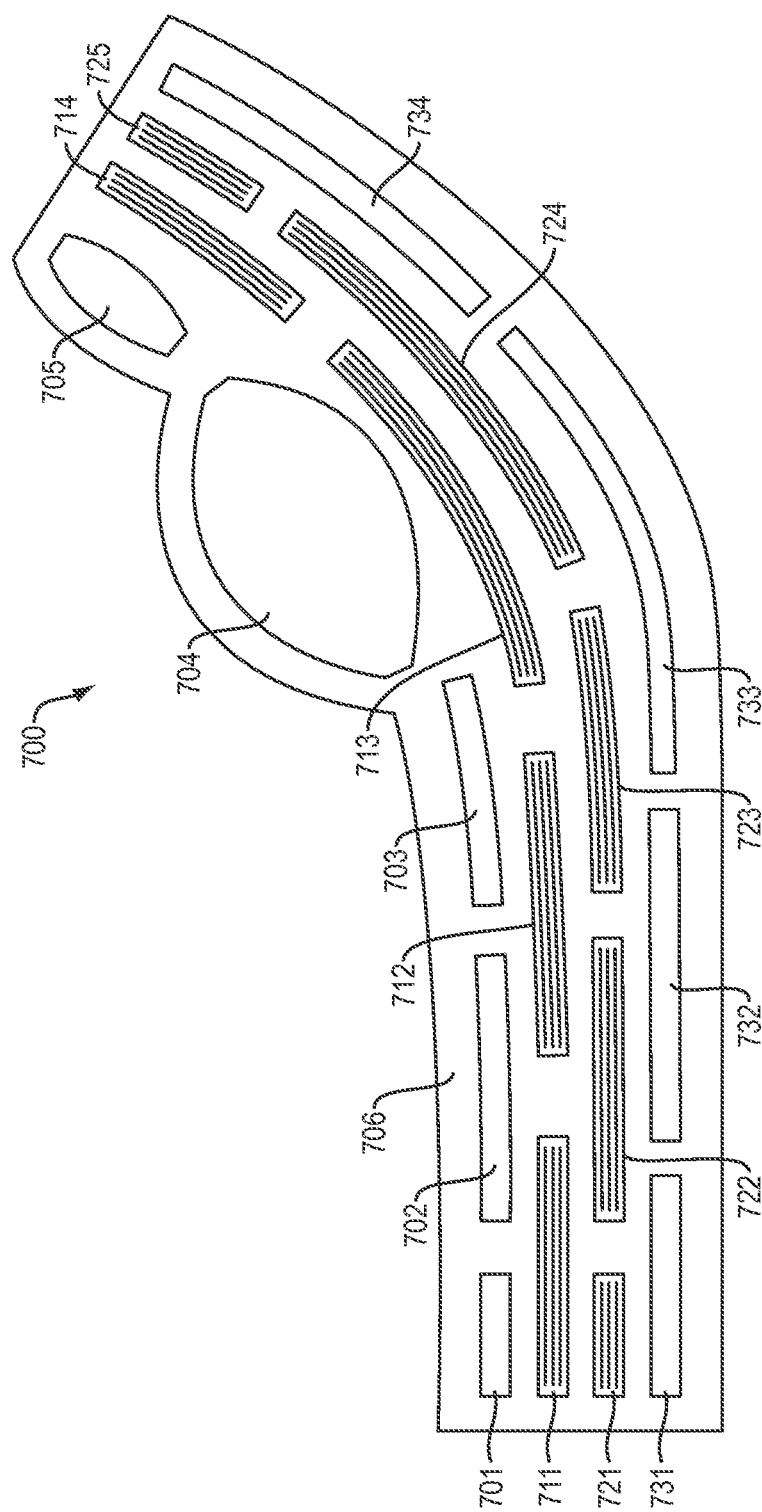
FIG. 7 shows a device in which (a) some, but not all of the actuation bladders in a device are inflated to cause bending of the device, and (b) some, but not all, of the layer-jamming bladders are layer-jammed, so that the device is rigid in some regions and flexible in other regions.

FIG. 7 shows a device in which (a) some, but not all of the actuation bladders in a device are inflated to cause bending of the device, and (b) some, but not all, of the layer-jamming bladders are layer-jammed, so that the device is rigid in some regions and flexible in other regions. In the example shown in FIG. 7, a flexible device 700 comprises actuation bladders and layer-jamming bladders embedded in a flexible substrate 706. Actuation bladders 701, 702, 703, 731, 732, 733, 734 are not inflated; but actuation bladders 704, 705 have been inflated, causing the device 700 to bend. Layer-jamming bladders 711, 712, 721, 722, 723 are layer-jammed; and thus the region in which they are located is resistant to bending. Other layer jamming bladders 713, 714, 724, 725 are unjammed, and thus the region in which they are located is free to bend in response to the inflation of actuation bladders 704, 705.

Figure 8:
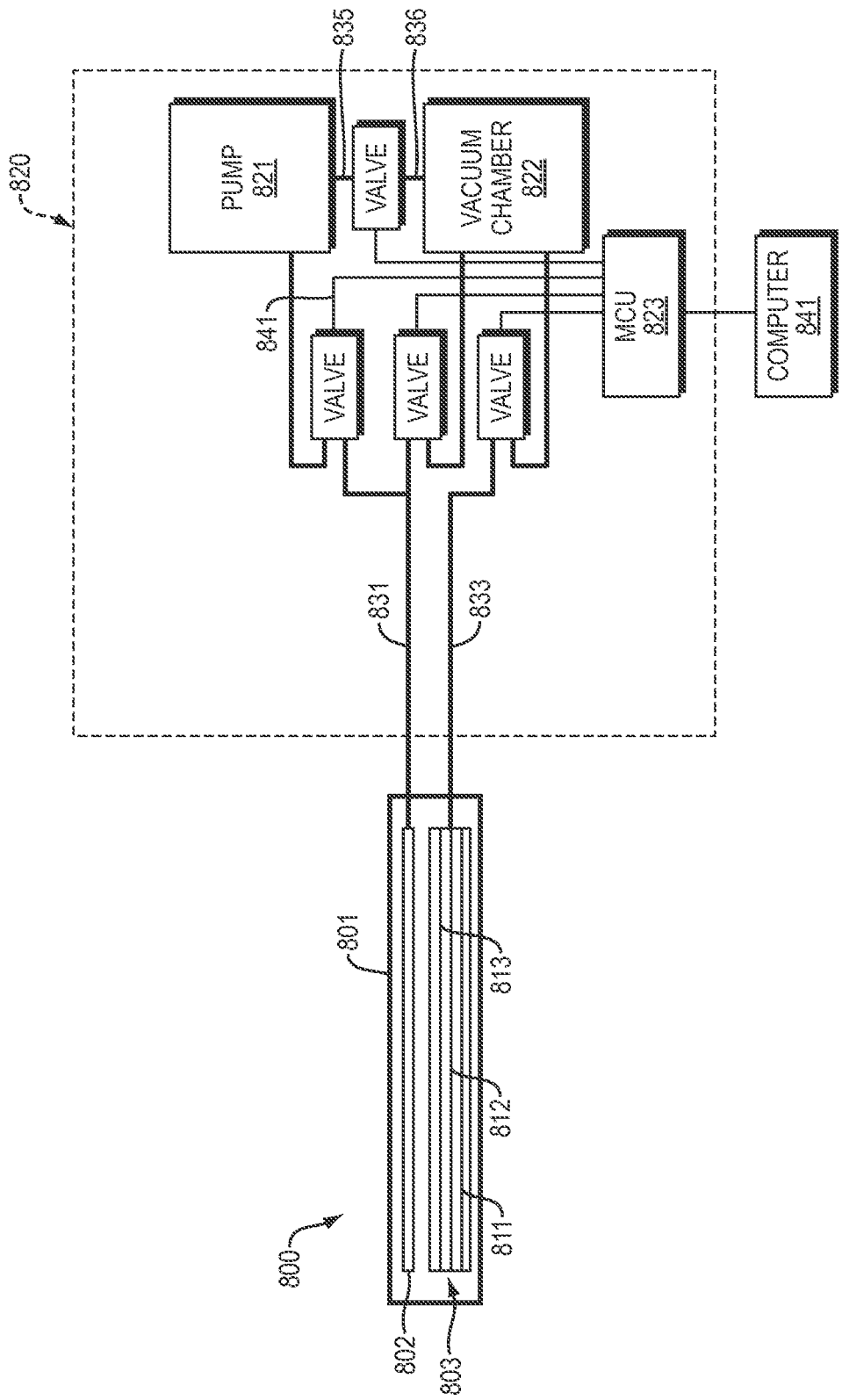
FIGS. 8, 9, and 10 illustrate a method in which an actuation bladder is inflated to change the shape of a device, and then a layer jamming bladder is layer jammed to make the device rigid in the new shape.
Figure 9:
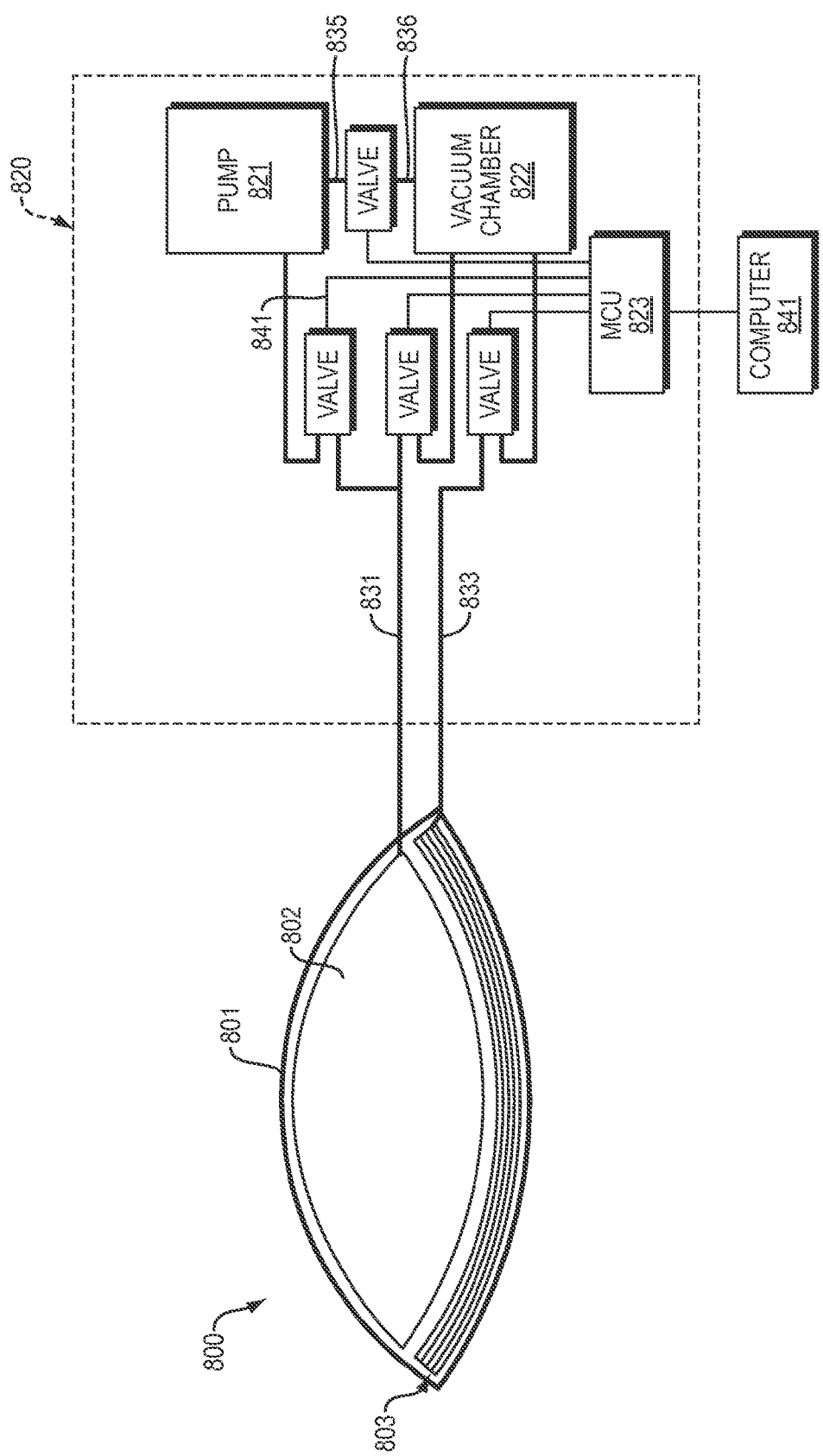
Figure 10:
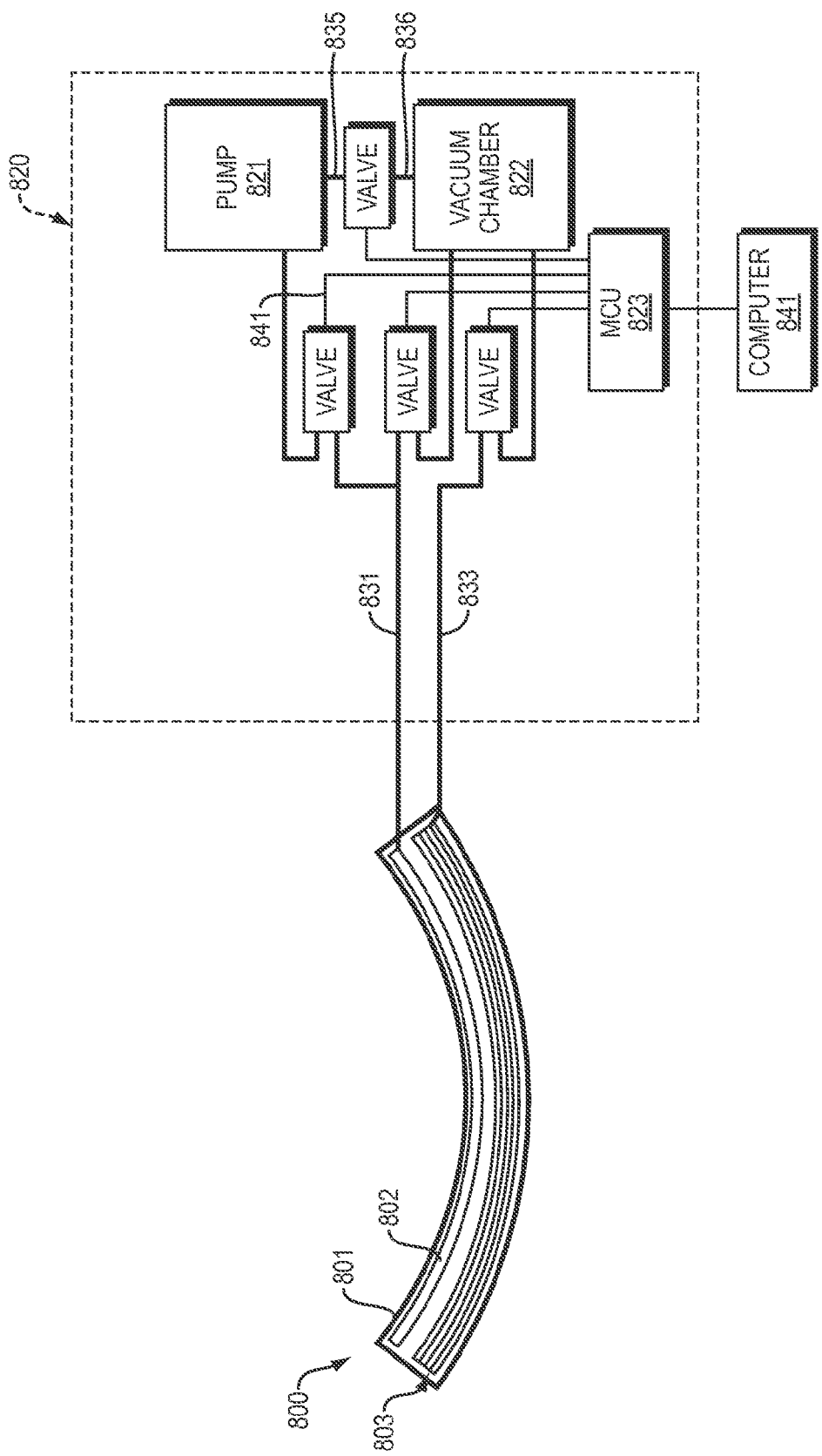

FIGS. 8, 9 and 10 show an example of pumping fluid into or out of an actuation bladder to change the shape of a device 800, and using layer jamming to control the rigidity of the device. In the examples shown in FIGS. 8, 9, and 10, an outer bladder 801 encloses two inner bladders 802, 803. The first inner bladder 802 is an actuation bladder that is inflated or deflated in order to change the shape of device 800. The second inner bladder 803 is configured for layer jamming; it contains flexible sheets that become rigid when air is evacuated from it.

In the examples shown in FIGS. 8, 9, and 10, the pump system 820 includes a pump 821, a vacuum chamber 822, valves, a pressure sensor (not shown), a microcontroller 823 for controlling the valves and pumps, tubes (represented by dark lines, such as 831, 833, 835, 836) and wires (represented by lighter lines, such as 841). The pump system controls air pressure in inner bladder 802, and separately controls air pressure in inner bladder 803. The pump system does so by pumping air into or out of an inner bladder (802 or 803), or by rapidly evacuating air from an inner bladder (802 or 803) into the vacuum chamber 822.

In FIG. 8, the actuation bladder 802 is deflated and the layer jamming chamber 803 is flexible.

Then the pump 821 pumps air into the actuation bladder 802, causing the actuation bladder 802 to inflate and change the shape of the device 800. At this point, the layer jamming bladder 803 is still flexible.

Then the pump 821 pumps air out of the layer jamming bladder 803 (or, alternatively, air is evacuated from the layer jamming bladder 803 into the vacuum chamber 822). The removal of air from the layer jamming bladder 803 (by pumping or evacuation) causes the sheets inside that bladder to become rigid by layer jamming. FIG. 9 shows the device 800 after this has been done. In FIG. 9, the actuation bladder 802 is inflated, and the layer jamming bladder 803 is rigid. Thus, in FIG. 9, the device 800 is overall in a rigid, inflated state.

Then air is removed from the actuation bladder 802 by pumping (or, alternatively, by evacuation into the vacuum chamber). The removal of air from the actuation bladder 802 causes the actuation bladder to deflate.

FIG. 10 shows the device 800 after the step described in the preceding paragraph (deflating the actuation bladder 802) has been done. Thus, in FIG. 10, the device is overall in a rigid, thin form factor.

Then the pump 821 pumps air into the layer jamming bladder 803, causing that bladder to "unjam" (i.e., reverse layer jam) and become flexible. At that point, device 800 can be bent into another shape, including back into the flat shape shown in FIG. 8.

FIGS. 8, 9, and 10 show a device which contains only a single layer-jamming bladder (for controlling rigidity) and a single actuation bladder (for controlling bending or other shapes of the device). However, a device may include multiple layer-jamming bladders and multiple actuation bladders, as shown in FIGS. 6 and 7. In that case, many variations (and temporal sequences of variations) of the rigidity and shape of the device can be achieved. In the examples shown in FIGS. 6 and 7, by layer jamming (or by reverse layer jamming) different combinations of the layer-jamming bladders and by inflating or deflating different combinations of the actuation bladders, the rigidity of the device may be controlled and shape changes of the device may be actuated in numerous different combinations or permutations.

Figure 11:
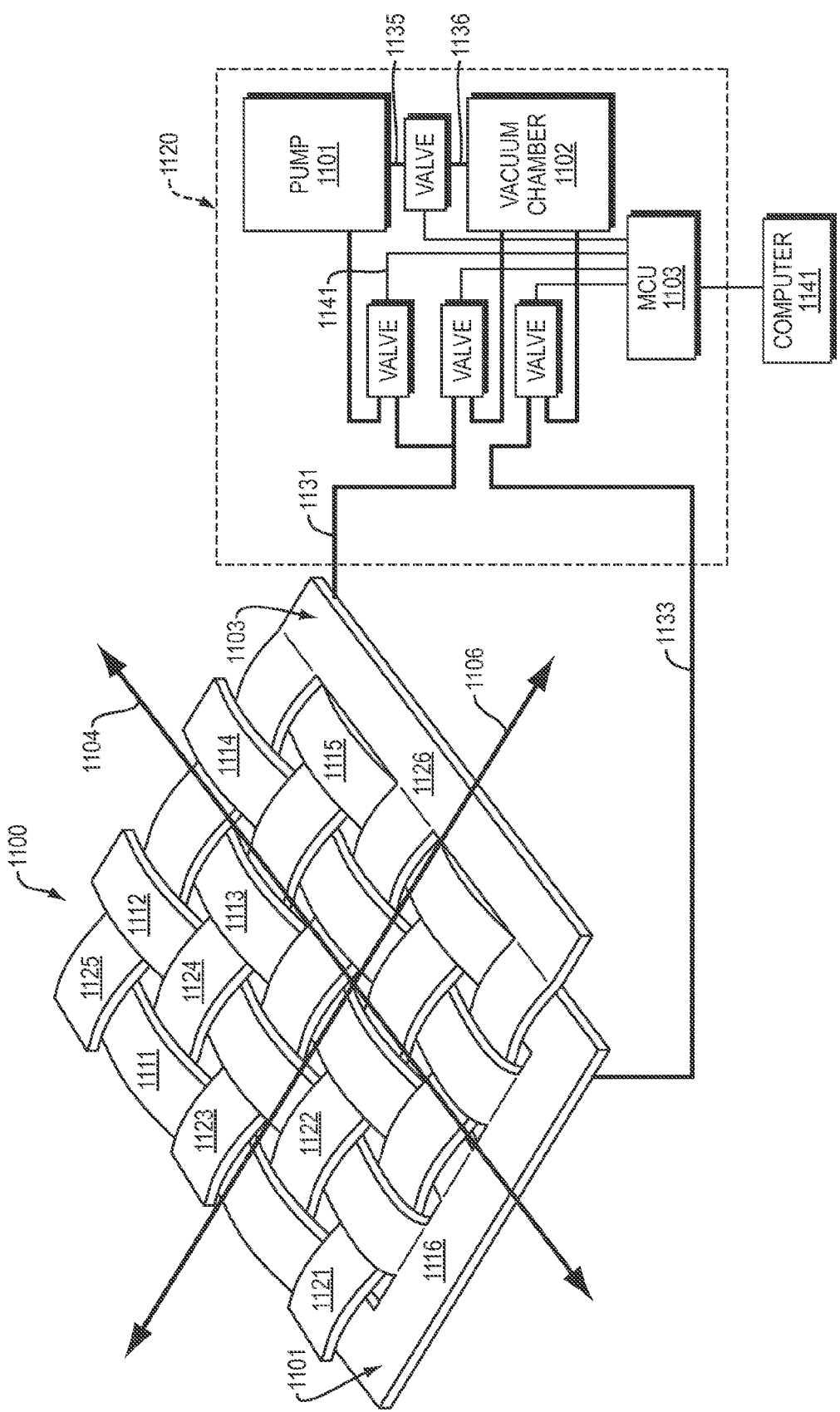
FIGS. 11, 12A, 12B and 12C illustrate a method in which a woven device, with anisotropic rigidity, is bent in a desired direction.
Figure 12A:
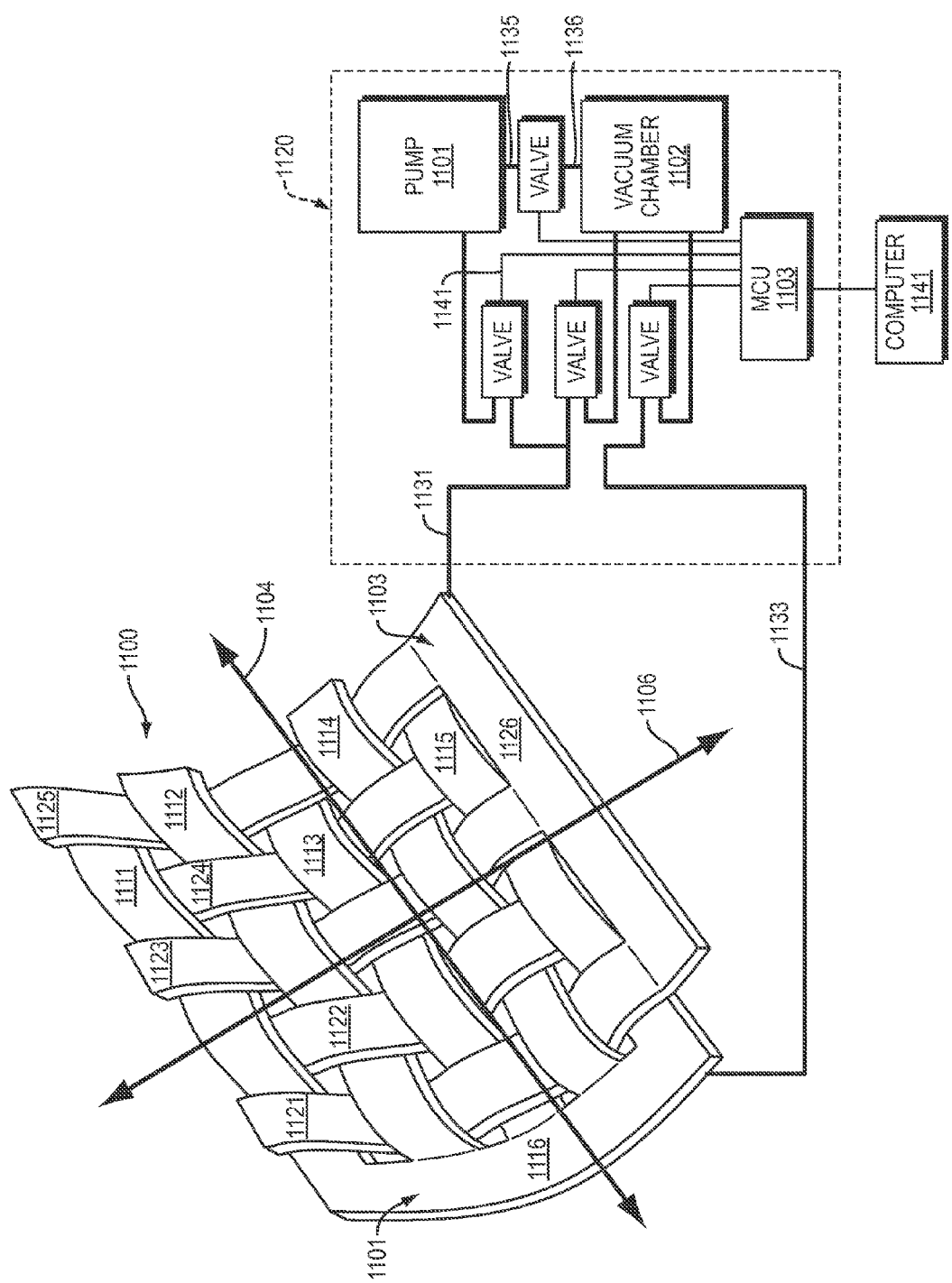

FIGS. 11 and 12A show an example of using interwoven bladders to anisotropically control rigidity of a device 1100.

In FIGS. 11 and 12A, two sets of bladders are interwoven: a first set of bladders (1111, 1112, 1113, 1114, 1115, 1116) and a second set of bladders (1121, 1122, 1123, 1124, 1125, 1126). The first set of bladders together form a single integral structure and share a first cavity among them, such that a portion of the first cavity is in each of the six bladders in the first set of bladders. Likewise, the second set of bladders together form a single integral structure and share a second cavity among them, such that a portion of the second cavity is in each of the six bladders in the second set of bladders.

In FIG. 11, the first and second set of bladders are not layer-jammed. As a result, they are flexible. The overall shape of device 1100 is roughly flat.

Then pump 1101 pumps air out of the first set of bladders 1111, 1112, 1113, 1114, 1115, 1116 (or, alternatively, air is evacuated from this first set of bladder into the vacuum chamber 1102). The removal of air from the first set of bladders 1111, 1112, 1113, 1114, 1115, 1116 (by pumping or evacuation) causes the sheets in the first set of bladders to become rigid by layer jamming. However, air is not removed from the second set of bladders 1121, 1122, 1123, 1124, 1125, 1126, so the second set of bladders remains unjammed.

As a result, the rigidity of device 1100 is anisotropic—that is, device 1100 is more flexible in some directions than in others. Device 1100 can bend more easily along lines that are parallel to the longitudinal axes of the jammed first set of bladders, than along lines that are perpendicular to these longitudinal axes. This is because: (1) empty space between layer jammed bladders 1111, 1112, 1113, 1114, 1115 does not resist bending about axis 1104; (2) the alignment of the jammed first set of bladders is such that only one layer jammed bladder 1116 is aligned to optimally resist bending about axis 1104; and (3) the unjammed bladders 1121, 1122, 1123, 1124, 1125, 1126 do not significantly resist bending.

Then, this anisotropic rigidity is exploited, by bending device 1100 in a direction in which device 1100 is more flexible. In the example shown in FIGS. 11 and 12A, this bending of device 1100 occurs about an axis 1104 that is substantially parallel to the alignment of five of the layer-jammed bladders 1111, 1112, 1113, 1114, 1115 along their longest dimensions. In some implementations, this bending is actuated by an externally applied force, such as manipulation by a human hand. In other implementations, this bending is actuated by one or more inner actuation bladders that are located inside the first or second set of bladders, as discussed below.

Then air is removed from the second set of bladders 1121, 1122, 1123, 1124, 1125, 1126 (either by evacuating the air into the vacuum chamber 1103 or by using the pump 1101 to pump out the air). The removal of air from the second set of bladders causes the second set of bladders to layer jam, while the overall shape of the device 1100 remains bent.

FIG. 12A shows the device 1100 after the steps described in the preceding four paragraphs have occurred (i.e., after (a) layer jamming the first set of bladders, (b) bending the device, and (c) layer jamming the second set of bladders.) In FIG. 12A, both the first and second sets of bladders are layer-jammed. Thus, in FIG. 12A, the device 1100 is overall in a rigid, bent state.

The above process is reversible as follows: Pump 1101 pumps air into both the first and second set of bladders to reverse layer jam them, causing them to become soft and flexible. The device is then bent back into the initial state, either by an external force or by internal actuation.

In some implementations of the device shown in FIGS. 11 and 12A, only layer-jammable bladders are used. In that case, bending of the bladders is actuated by an external force (e.g., manipulation by a human hand).

In other implementations of the device shown in FIGS. 11 and 12A, each bladder in the first and second set of bladders itself comprises an outer bladder and two inner bladders. In that case: (a) one inner bladder is inflatable, and is used to actuate bending; and (b) the other inner bladder contains sheets and is used for layer jamming.

Figure 12B:
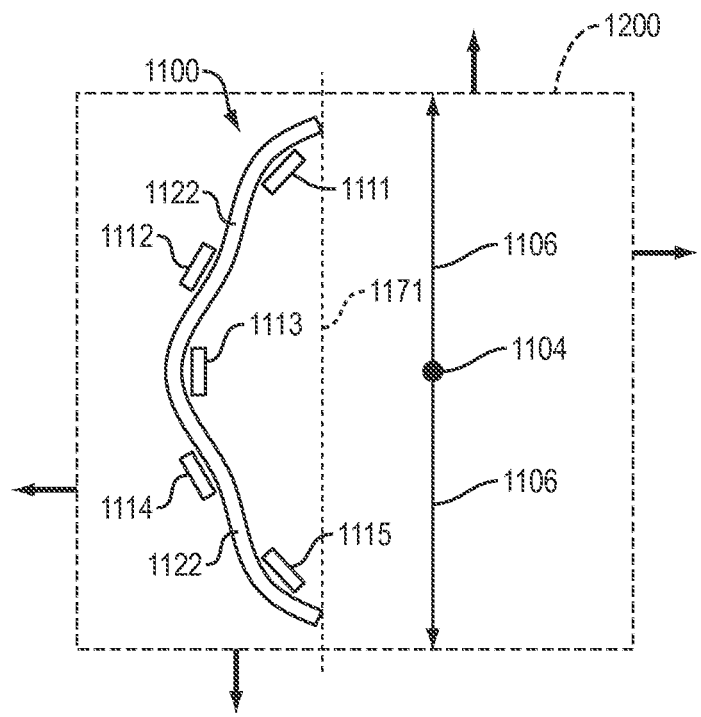

FIG. 12B is a cross-sectional view that shows bending of device 1100 about axis 1104. The cross-section is along plane 1200. In FIG. 12B: (a) axis 1104 is perpendicular both to axis 1106 and to plane 1200; (b) axis 1104 is substantially parallel to orientation lines of bladders 1111, 1112, 1113, 1114, 1115, respectively; and (c) orientation line 1171 of bladder 1122 is substantially parallel to axis 1106.

As used herein, "orientation line" of an elongated bladder (regardless of whether the bladder itself is straight or curved) means a straight line that intersects both longitudinal ends of the bladder.

Alternatively, the system shown in FIGS. 11 and 12 can cause bending about a different axis 1106 that is perpendicular to axis 1104. For example, bending about this different axis 1106 occurs in the following, alternative process: (a) start with the device state shown in FIG. 11; (b) then layer-jam the second group of bladders 1103; (c) then bend device 1100; and (d) then layer jam the first group of bladders 1101, to make the device 1100 rigid in the bent state.

Figure 12C:
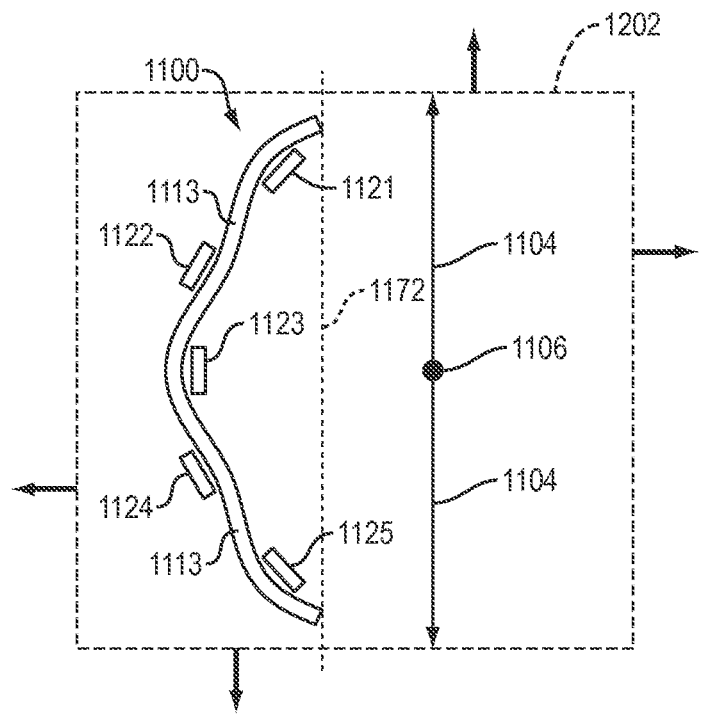

FIG. 12C is a cross-sectional view that shows bending of device 1100 about axis 1106. The cross-section is along plane 1202. In FIG. 12C: (a) axis 1106 is perpendicular both to axis 1104 and to plane 1202; (b) axis 1106 is substantially parallel to orientation lines of bladders 1121, 1122, 1123, 1124, 1125, respectively; and (c) orientation line 1172 of bladder 1113 is substantially parallel to axis 1104.

In the example shown in FIGS. 11 and 12A, the pump system 1120 includes a pump 1101, a vacuum chamber 1102, valves, a pressure sensor (not shown), a microcontroller 1103 for controlling the valves and pumps, tubes (represented by dark lines, such as 1131, 1133) and wires (represented by lighter lines, such as 1141). The pump system controls air pressure in the first set of bladders, and separately controls air pressure in the second set of bladders. The pump system does so by pumping air into or out of bladders, or by rapidly evacuating air from bladders into the vacuum chamber 1103.

In illustrative implementations, an interwoven pattern of layer-jammable bladders has at least four benefits:

First, interwoven bladders can have anisotropic rigidity, when some of the bladders are layer-jammed and others are not. Spaces between layer-jammed, parallel bladders create regions of flexibility.

Second, interwoven bladders may be sparse (with space between the bladders), thereby reducing weight.

Third, in illustrative implementations, the woven pattern creates additional structural strength because the woven pattern would prevent the structure, once it is rigid, from being pulled apart, even if there were no friction between the bladders.

Fourth, a woven pattern (in which a first bladder goes over or under a second bladder) tends to increase the area of contact the two bladders, and thus to increase the frictional forces between the two bladders. In contrast, simply laying a first bladder on top of a second bladder—without weaving them together—would result in less area of contact and less friction between the two bladders.

In some implementations, a layer-jamming bladder includes sheets that are creased at a crease. Once the bladder is bent to a desired angle at the crease, fluid is removed from bladder, causing the bladder to layer jam while bent at the desired angle.

Figure 13:
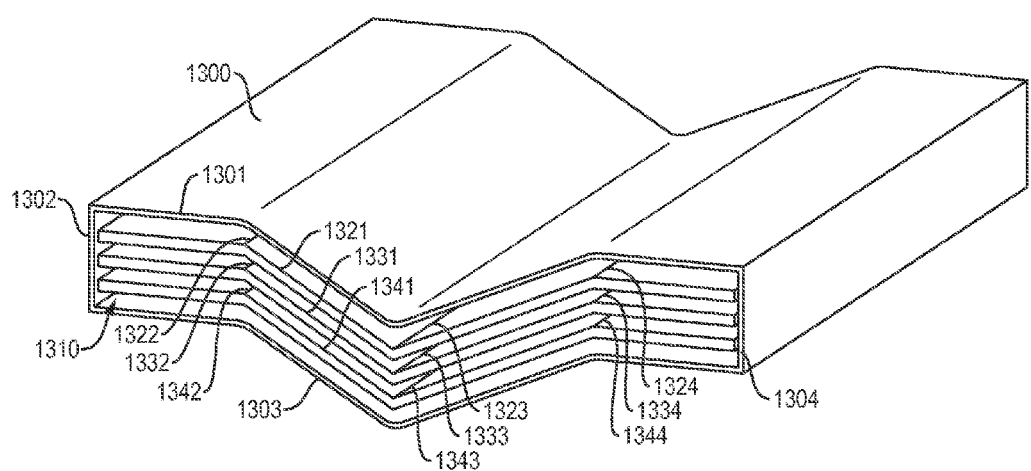
FIGS. 13, 14A, 14B, 14C, 14D, 15A and 15B show examples of creases.

FIG. 13 shows a layer jamming bladder 1300 with creases. In the example shown in FIG. 13, a cavity 1310 is inside walls 1301, 1302, 1303, 1304. Inside the cavity 1310 are fluid and sheets 1321, 1331, 1341. Sheet 1321 is creased at creases 1322, 1323, 1324, sheet 1331 is creased at creases 1332, 1333, 1334, and sheet 1341 is creased at creases 1342, 1343, 1344. In the example shown in FIG. 13, bending of the bladder, while the bladder is unjammed, is caused by an external force (e.g., by manipulation by a human hand).

If creases are used, the creases may be located in any position that affects bending when a bladder is inflated or layer jammed. FIGS. 13, 14A, 14B, 14C and 14D show examples of crease positions.

Figure 14A:
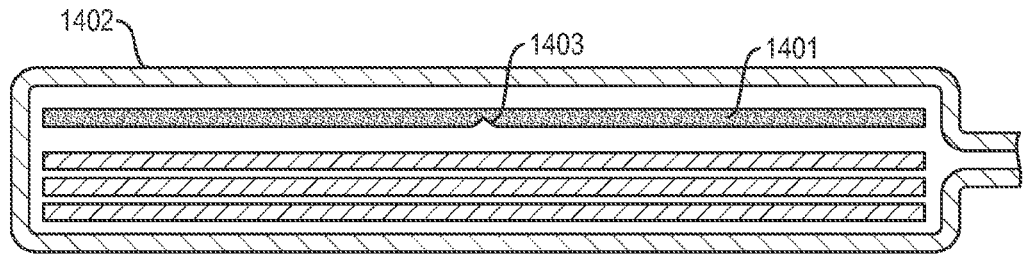
Figure 14B:
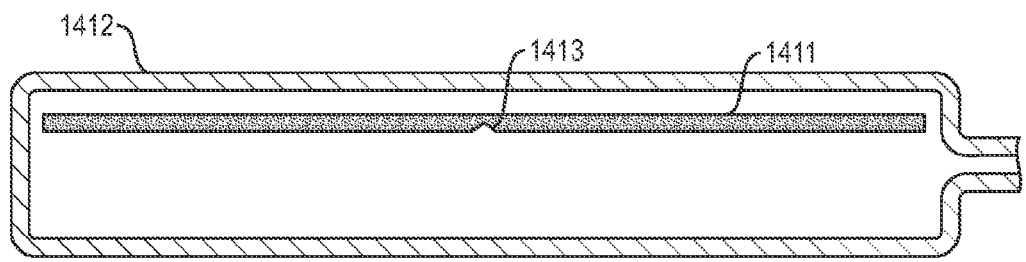
Figure 14C:
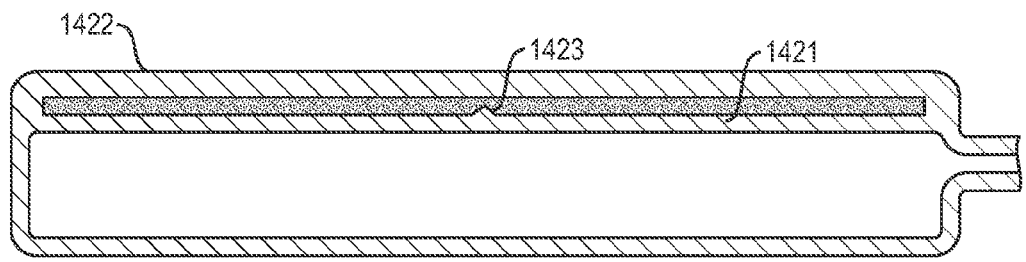
Figure 14D:
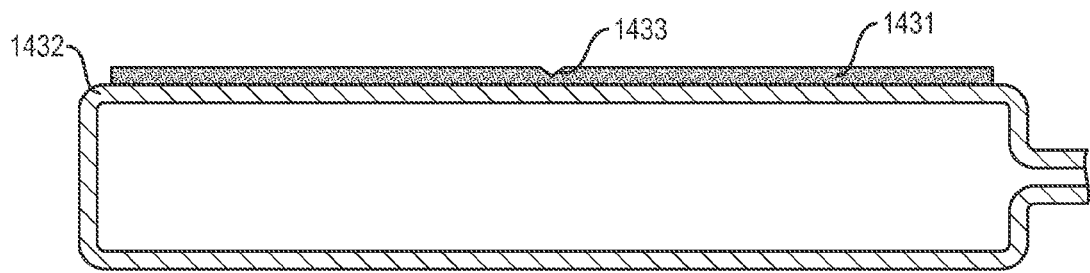

In some implementations, one or more of the following features are present: (a) jamming sheets in a layer jamming bladder are themselves creased by creases, as shown in FIG. 13; (b) a rigid layer 1401 in a layer jamming bladder 1402 is creased by a crease 1403, as shown in FIG. 14A; (c) a rigid layer 1411 in an actuation bladder 1412 is creased by a crease 1413, as shown in FIG. 14B; (d) a rigid layer 1421 that is embedded in an outer bladder wall 1422 is creased by a crease 1423, as shown in FIG. 14C; or (e) a rigid layer 1431 that is affixed to, but outside, an outer bladder wall 1432 is creased by a crease 1443, as shown in FIG. 14D.

Figure 15A:
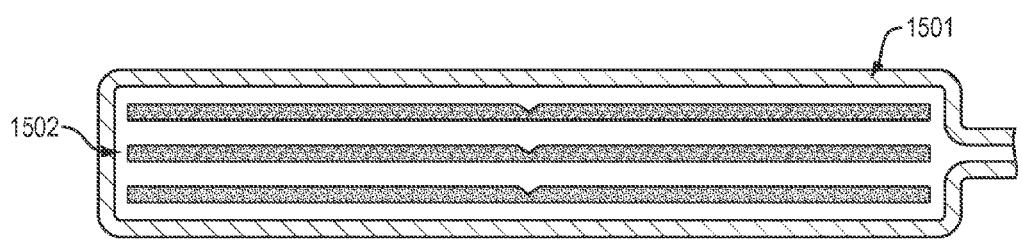
Figure 15B:
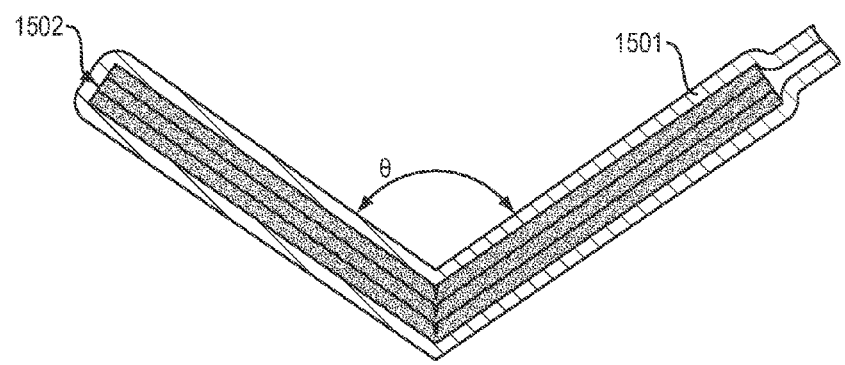

FIGS. 15A and 15B illustrate bending a device at a crease and then layer jamming the device when it is bent at the crease to a desired angle. Layer-jamming bladder 1501 includes sheets 1502 that are creased. In FIG. 15A, the layer jamming bladder 1501 is flexible and the device is not bent. Then the device is bent at the crease to a desired angle θ. Then fluid is removed from the layer-jamming bladder 1501 (e.g., by pumping or by evacuation into a vacuum chamber), causing the sheets 1502 to layer-jam, and thereby making the layer-jamming bladder 1501 rigid at a desired angle θ.

In some implementations, one or more bladders are used for layer jamming and one or more other bladders are used to actuate bending or other changes in shape. This approach (using some bladders for layer jamming and other bladders for inflation and shape control) and can be used in any implementation of this invention, including for interwoven bladders and for bladders that bend at creases.

In some cases, if a woven pattern is used (such as in FIGS. 2A and 2B) the "warp" and "weft" bladders intersect at substantially 90 degree angles when viewed from directly above, ignoring ups and downs associated with interweaving. However, the angle of intersection in the woven pattern can be any angle. For example, in some implementations, the angle of intersection between bladders in a woven pattern that are touching each other is any angle between 1 degree and 90 degrees.

In some cases, if a woven pattern is used (such as in FIGS. 2A and 2B) only two sets of bladders are interwoven. However, the number of different sets of bladders that are interwoven can be any number greater than or equal to two. For example, in some implementations, the number of different sets of bladders that are interwoven is two, three, four, five, six, seven, or eight.

FIGS. 16A, 16B, 17A and 17B show examples of woven devices that comprise bladders interwoven in a triangular pattern.

Figure 16A:
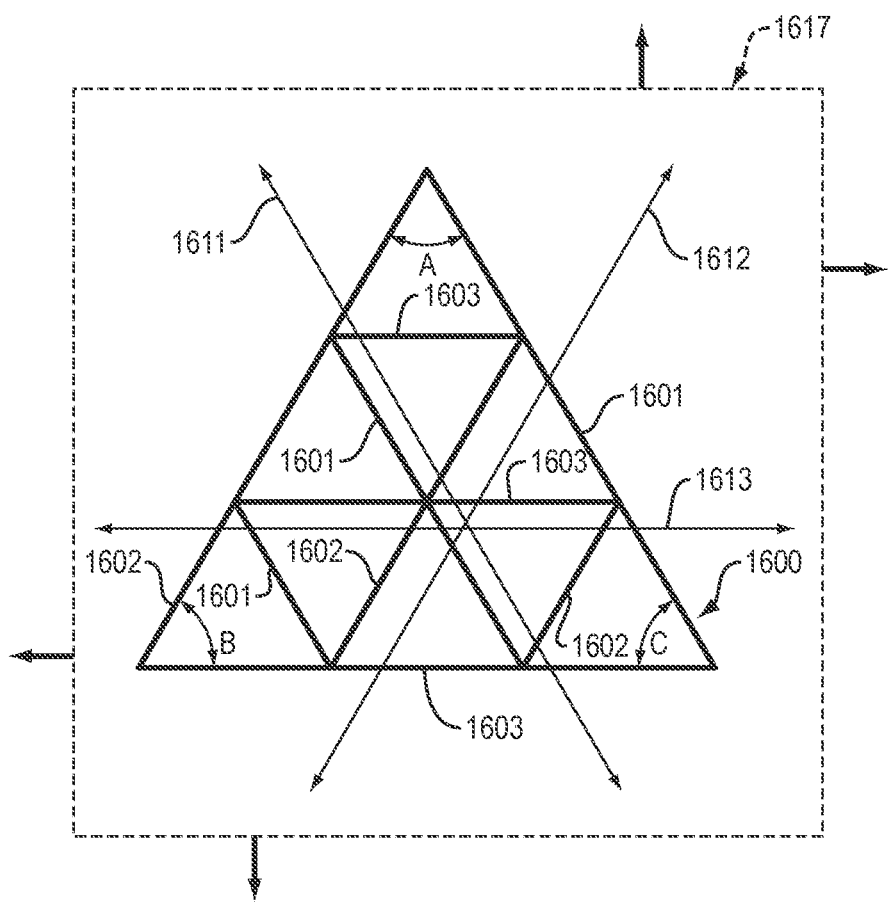
FIGS. 16A, 16B, 17A and 17B show examples of woven devices that comprise bladders interwoven in a triangular pattern.

FIG. 16A illustrates a device 1600 in which three different sets of layer jamming bladders 1601, 1602, 1603 are interwoven. In FIG. 16A, a portion of the woven bladders is represented by intersecting lines. (These intersecting lines numbered 1601, 1602, 1603 represent the dark silhouette that would be seen if the portion of the woven bladders were seen from directly above when lit only by a bright light directly below). The bladders are interwoven at 60 degree angles (e.g. angles A, B and C each are equal to 60 degrees).

In the example shown in FIG. 16A, rigidity of device 1600 can be controlled in at least three different directions. For example, in order to make the woven device 1600 more flexible for bending about axis 1611, only the first set of bladders 1601 is layer-jammed and the other sets of bladders 1602, 1603 are not layer-jammed. Likewise, in order to make the woven device 1600 more flexible for bending about axis 1612, only the second set of bladders 1602 is jammed and the other sets of bladders 1601, 1603 are not layer-jammed. Likewise, in order to make the woven device 1600 more flexible for bending about axis 1613, only the third set of bladders 1603 is jammed and the other sets of bladders 1601, 1602 are not layer-jammed.

Figure 16B:
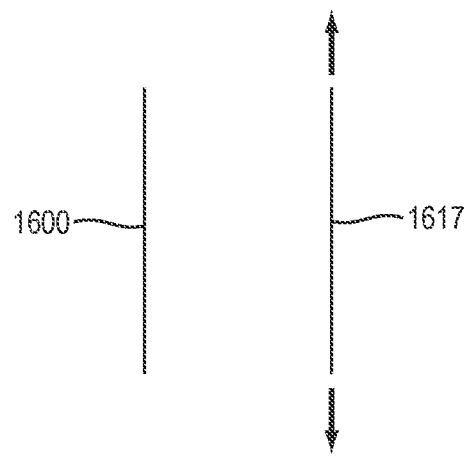

FIGS. 16A and 16B show the positions of axes 1611, 1612, 1613. Specifically: FIG. 16A shows a top view of the woven device 1600. Three axes 1611, 1612, 1613 intersect each other at angles of 60 degrees and are located entirely in plane 1617. FIG. 16B is a side view, which shows that plane 1617 (and thus axes 1611, 1612, 1613) are at a distance from the woven device 1600. When the overall shape of device 1600 is flat: (a) axis 1611 is substantially parallel to the longitudinal axes of the first set of bladders 1601; (b) axis 1612 is substantially parallel to the longitudinal axes of the second set of bladders 1602; and (c) axis 1613 is substantially parallel to the longitudinal axes of the third set of bladders 1603.

Figure 17A:
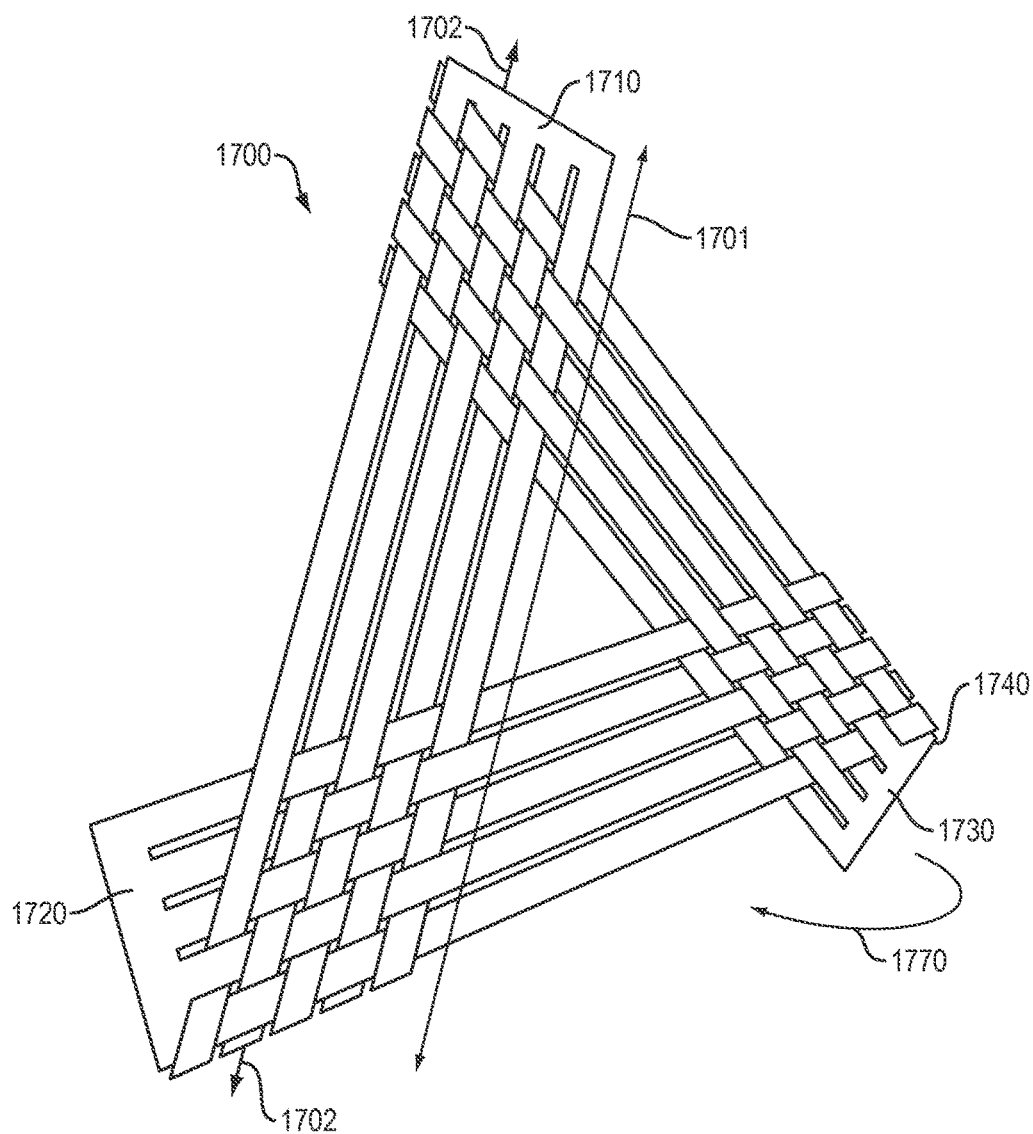

FIG. 17A shows a woven device 1700 that comprises three sets of bladders 1710, 1720, 1730 interwoven in a triangular pattern. Each of these three sets of bladders, respectively, comprises a single integral structure with five protuberances (similar to a hand with five fingers). When one of the sets of bladders is layer-jammed, and the other two sets of bladders are not, then the woven device can be easily bent about an axis that is substantially parallel to the longitudinal axes of the layer jammed set of bladders.

In the example shown in FIG. 17A: (a) the woven device 1700 is flat in overall shape; (b) a first set of bladders 1710 is layer-jammed and thus is rigid; (c) the second and third sets of bladders 1720, 1730 are not layer jammed and thus are flexible; (d) arrow 1770 indicates a direction in which the woven device 1700 can be easily bent (e) orientation line 1702 intersects both longitudinal ends of a bladder in the first set of bladders 1710; (f) axis 1701 is substantially parallel to orientation line 1702; (g) the woven device 1700 can be easily bent about axis 1701; and (h) corner 1740 is in a portion of the woven device 1700 that is not layer jammed.

Figure 17B:
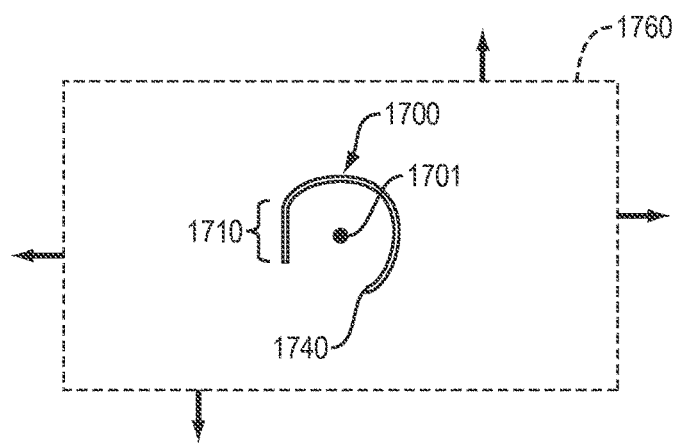

FIG. 17B shows a side view of the woven device 1700, after it has been bent. The bending occurred while the first set of bladders 1710 were layer jammed and the second and third sets of bladders 1720, 1730 were not layer jammed. FIG. 17B is a cross-sectional view, the cross-section being in plane 1760. Plane 1760 is perpendicular to axis 1701. In FIG. 17B, the woven device 1700 is bent about axis 1701.

In some implementations, sheets in a layer-jamming bladder are in solid phase.

In exemplary implementations of this invention, one or more electronic computers are specially adapted: (1) to control the operation of, or interface with, hardware components of apparatus for controlling the shape and rigidity of a device comprising one or more bladders, including any pump, valve, sensor or electrode; (2) to receive signals indicative of human input, (3) to output signals for controlling transducers for outputting information in human perceivable format, and (4) to process data, to perform computations, to execute any algorithm or software, and to control the read or write of data to and from memory devices. The one or more computers may be located in any position or positions within or outside of the apparatus. For example: (a) at least some of the one or more computers may be embedded within or housed together with other components of the apparatus, such as a pump, valve or sensor, and (b) at least some of the one or more computers may be remote from other components of the apparatus. The one or more computers may be connected to each other or to other components in the apparatus either: (a) wirelessly, (b) by wired connection, or (c) by a combination of wired and wireless connections. For example, one or more electronic computers may comprise a microprocessor 440, 540, 672, 823, 1103 or an external computer 841, 1141.

In exemplary implementations, one or more computers are programmed to perform algorithms, including algorithms for controlling the rigidity or shape of a device. For example, in some cases, programming for a computer is implemented as follows: (a) a machine-accessible medium has instructions encoded thereon that specify steps in an algorithm; and (b) the computer accesses the instructions encoded on the machine-accessible medium, in order to determine steps to execute in the algorithm. In exemplary implementations, the machine-accessible medium comprises a tangible non-transitory medium. For example, the machine-accessible medium may comprise (a) a memory unit or (b) an auxiliary memory storage device. For example, while a program is executing, a control unit in a computer may fetch the next coded instruction from memory.

Definitions:

The terms "a" and "an", when modifying a noun, do not imply that only one of the noun exists.

To say that a line "bends about" a point means that the line curves at least to some extent around the point and does not intersect the point. To say that a surface "bends about" an axis means that at least one line, which line is an intersection of the surface with a plane that is perpendicular to the axis, curves at least to some extent around the axis and does not intersect the axis. For example: (a) a circle bends about its center point; (b) a parabola bends about its focus; (c) an ellipse bends about both of its two foci; (d) a right circular cylinder bends about its axis; and (e) an elliptic paraboloid bends about its axis. Symmetry is not required, in order for a line or surface to bend about a point or axis, respectively.

"Bladder" means an inflatable container. For example: (a) in some cases, a set of bladders comprises separate bladders; (b) in some cases, each respective bladder in a set of bladders is fluidically connected to, and shares a common cavity with, one or more other bladders in the set; (c) in some cases, each respective bladder in a given set of bladders is an elongated protuberance and is part of a single, integral structure that includes one or more other bladders in the given set. The term "bladder" does not include any human organ or other part of a human.

To "change the shape" of two things does not imply that the two things have the same shape.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device. For example, in some cases, a "computer" comprises: (a) a central processing unit, (b) an ALU (arithmetic/logic unit), (c) a memory unit, and (d) a control unit that controls actions of other components of the computer so that encoded steps of a program are executed in a sequence. For example, the term "computer" may also include peripheral units, including an auxiliary memory storage device (e.g., a disk drive or flash memory). However, a human is not a "computer", as that term is used herein.

The term "contain" (and grammatical variations thereof) shall be construed as if followed by "without limitation". If A contains B, then A contains B and may contain other things.

The term "container" does not require total enclosure. For example, in some implementations, a "container" has a hole in a wall of the container, which creates an orifice connecting a cavity inside the container with an external environment. The terms "contain" and "enclose" also do not require total enclosure. For example, a fluid may be "contained" or "enclosed" in a bladder, even if the bladder has a hole that opens to a region external to the bladder.

The noun "crease" means a crease, groove or other elongated indentation. To be "creased" means to have a shape that includes a crease, groove or other elongated indentation.

"Defined Term" means a term that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

To say that an object is "elongated" has no implication regarding whether the object is curved or straight.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

Liquid and gas are each a non-limiting example of a "fluid".

The term "for instance" means for example.

As used herein, the terms "go over" and "go under" do not mean movement over time, but instead, each of these terms describes a relative spatial position. For example, a warp thread in a woven pattern "goes over" a first weft thread and "goes under" a second weft thread if a portion of the warp thread is over the first weft thread and simultaneously another portion of the warp thread is under the second weft thread.

"Herein" means in this document, including text, specification, claims, abstract, and drawings.

The term "hole" includes any hole, cavity, gap, opening or orifice.

The terms "horizontal" and "vertical" shall be construed broadly. For example, "horizontal" and "vertical" may refer to two arbitrarily chosen coordinate axes in a Euclidean two dimensional space, regardless of whether the "vertical" axis is aligned with the orientation of the local gravitational field. For example, a "vertical" axis may oriented along a local surface normal of a physical object, regardless of the orientation of the local gravitational field.

Unless the context clearly indicates otherwise: (1) the term "implementation" means an implementation of this invention; (2) the term "embodiment" means an embodiment of this invention; and (3) the term "cases" means implementations of this invention.

The term "include" (and grammatical variations thereof) shall be construed broadly, as if followed by "without limitation".

To "inflate" an object means to expand the total external surface area of the object by elastic deformation due to pressure of a fluid within the object. Similar terms, such as "inflation" and "inflatable", shall be construed in like manner.

An "interlaced" pattern means a pattern comprising a first set of at least four elongated objects and a second set of at least four elongated objects, wherein the first and second sets are positioned relative to each other such that: (i) each object in the first set of objects (A) goes over at least two objects in the second set of objects and under at least one object in the second set of objects, or (B) goes under at least two objects in the second set of objects and over at least one object in the second set of objects, and (ii) each object in the second set of objects (A) goes over at least two objects in the first set of objects and under at least one object in the first set of objects, or (B) goes under at least two objects in the first set of objects and over at least one object in the first set of objects. In the preceding sentence, a "set of objects" does not need to comprise a set of separate objects. For example, in some cases, one or more objects in a given set of objects may be connected to, or part of a single structure with, other objects in the given set. Examples of "interlaced" patterns include: a plain weave (also known as tabby weave) pattern, a twill pattern, and a satin pattern.

"Layer jamming" means to increase rigidity of sheets that are inside a cavity, by decreasing the fluidic pressure of a fluid in the cavity. In layer jamming, decreasing this fluidic pressure increases compression of the sheets against each other, which compression is due to an external pressure transmitted through one or more walls of the cavity. This increased compression causes an increase in friction (or a coefficient of friction) between sheets.

The term "line" has no implication regarding whether the line is curved or straight. Some lines are curved; some lines are straight.

The term "magnitude" means absolute value.

The term "mobile computing device" or "MCD" includes any of the following electronic devices: a smartphone, cell phone, mobile phone, phonepad, tablet, laptop, notebook, notepad, personal digital assistant, enterprise digital assistant, ultra-mobile PC, or any handheld computing device. A device may be an MCD even if it is not configured for direct or indirect connection to an internet or world wide web.

The term "or" is inclusive, not exclusive. For example A or B is true if A is true, or B is true, or both A or B are true. Also, for example, a calculation of A or B means a calculation of A, or a calculation of B, or a calculation of A and B.

"Orientation line" of an elongated bladder (regardless of whether the bladder itself is straight or curved) means a straight line that intersects both longitudinal ends of the bladder.

A parenthesis is simply to make text easier to read, by indicating a grouping of words. A parenthesis does not mean that the parenthetical material is optional or can be ignored.

"Reverse layer jamming" means to decrease rigidity of sheets that are in a cavity, by increasing fluidic pressure of a fluid in the cavity. In reverse layer jamming, increasing this fluidic pressure in the cavity reduces the compression of the sheets against each other (which compression is due to external pressure being transmitted through one or more walls of the cavity). The reduced compression causes a reduction in friction (or a coefficient of friction) between sheets.

As used herein, the term "set" does not include a so-called empty set (i.e., a set with no elements). Mentioning a first set and a second set does not, in and of itself, create any implication regarding whether or not the first and second sets overlap (that is, intersect).

A "sheet" means a layer, in which the maximum width and maximum length of the layer are each more than 25 times greater than the median thickness of the layer. For purposes of the preceding sentence, the median thickness is computed from 100 uniformly spaced samples of the layer.

"Some" means a positive, nonzero number.

As used herein, a "subset" of a set consists of less than all of the elements of the set.

"Substantially parallel" means within 25 degrees of parallel.

"Substantially perpendicular" means within 25 degrees of perpendicular.

The term "such as" means for example.

"Tube" means a tube, pipe, hose or other channel for fluid conveyance.

"Tubing" means one or more tubes.

As used herein, the adjectives "warp" and "weft": (a) are each, respectively, indicative only of the orientation of an object, relative to other objects in a woven pattern; and (b) have no implication regarding the material properties, structure, type or features of the object. For example, the terms "warp" and "weft" do not imply a thread. For example, in some cases, a "warp" object or a "weft" object is a bladder.

The terms "woven" and "interwoven" include any woven pattern, including a tabby weave pattern, a twill pattern and a satin pattern.

Spatially relative terms such as "under", "below", "above", "over", "upper", "lower", and the like, are used for ease of description to explain the positioning of one element relative to another. The terms are intended to encompass different orientations of an object in addition to different orientations than those depicted in the figures.

Except to the extent that the context clearly requires otherwise, if steps in a method are described herein, then: (1) steps in the method may occur in any order or sequence, even if the order or sequence is different than that described; (2) any step or steps in the method may occur more than once; (3) different steps, out of the steps in the method, may occur a different number of times during the method, (4) any step or steps in the method may be done in parallel or serially; (5) any step or steps in the method may be performed iteratively; (6) a given step in the method may be applied to the same thing each time that the particular step occurs or may be applied to different things each time that the given step occurs; and (7) the steps described are not an exhaustive listing of all of the steps in the method, and the method may include other steps.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, or possessive forms, or different declensions, or different tenses. In each case described in this paragraph, Applicant is acting as Applicant's own lexicographer.

Variations:

This invention may be implemented in many different ways. Here are some non-limiting examples:

In one aspect, this invention is an apparatus comprising a first set of bladders and a second set of bladders, wherein: (a) at least one cavity exists within each respective bladder in the first and second sets of bladders, within which cavity are located (i) fluid, which fluid has a pressure, and (ii) two or more sheets, which sheets have a rigidity that is adjustable by adjustment of the pressure of the fluid; and (b) the first and second sets of bladders are interwoven with each other, such that: (i) each respective bladder in the first set of bladders (A) goes over at least two bladders in the second set of bladders and under at least one bladder in the second set of bladders, or (B) goes under at least two bladders in the second set of bladders and over at least one bladder in the second set of bladders, and (ii) each respective bladder in the second set of bladders (A) goes over at least two bladders in the first set of bladders and under at least one bladder in the first set of bladders, or (B) goes under at least two bladders in the first set of bladders and over at least one bladder in the first set of bladders. In some cases, the sheets, taken together, have a tensile strength in a direction, which tensile strength is adjustable by adjustment of the pressure of the fluid. In some cases, the fluid is a liquid. In some cases, the fluid is a gas. In some cases, two or more of the sheets comprise sandpaper. In some cases, in each respective bladder, abrasive particles are bonded to a surface of each of the sheets. In some cases, the apparatus further comprises a pump system, which pump system includes: (a) one or more pumps; (b) tubing that connects the first set of bladders to at least one pump and connects the second set of bladders to at least one pump; and (c) one or more valves; wherein fluid flow within the tubing is controllable by opening or closing of the valves. In some cases, a first fluid pressure within the first set of bladders and a second fluid pressure within the second set of bladders are each separately adjustable by the pump system. In some cases, the apparatus further comprises one or more computers that are programmed to control the one or more pumps and one or more valves. In some cases: (a) two or more bladders, in the first set of bladders, together comprise a single integral structure; and (b) two or more bladders, in the second set of bladders, together comprise a single integral structure. In some cases: (a) a portion of the first cavity is located within each bladder in the first set of bladders; and (b) a portion of the second cavity is located within each bladder in the second set of bladders. In some cases, the apparatus further comprises one or more additional sets of bladders, each of which additional sets of bladders is interwoven with the first or second sets of bladders. In some cases, bladders are interwoven at angles, relative to each other, that are not substantially perpendicular. Each of the cases described above in this paragraph is an example of the apparatus described in the first sentence of this paragraph, and is also an example of an embodiment of this invention that may be combined with other embodiments of this invention.

In another aspect, this invention is a method that comprises using a pump system: (a) to change a first fluid pressure of a fluid in a first bladder, and thereby to adjust stiffness of sheets that are in the first bladder by layer jamming; and (b) to change a second fluid pressure of a fluid in a second bladder, and thereby to cause the second bladder to undergo inflation or deflation, which inflation or deflation changes the shape of the first and second bladders; wherein (i) the first bladder is connected to the second bladder, such that inflation or deflation of the second bladder causes mechanical forces to be transmitted to the first bladder; and (ii) the pump system comprises one or more pumps connected by tubing to the first and second set of bladders. In some cases: (a) the sheets in the first bladder are stiffer when the first fluid pressure is below a first value than when the first fluid pressure is above the first value; (b) the second bladder is less inflated when the second fluid pressure is below a second value than when the second fluid pressure is above the second value; and (c) the method includes the steps of using the pump system (i) to increase the second fluid pressure above the second value, while the first fluid value remains above the first value, thereby at least partially inflating the second bladder and causing at least a portion of the first and second bladders to undergo bending, and (ii) then to decrease the first fluid pressure below the first value, thereby increasing the stiffness of the sheets in the first bladder. In some cases, the method further comprises an additional step that: (a) occurs after step (ii) in the preceding sentence; and (b) comprises using the pump system (1) to increase the first fluid pressure above the first value, thereby decreasing the stiffness of the sheets in the first bladder, and (2) to decrease the second fluid pressure below the second value, thereby at least partially deflating the second bladder. In some cases, the device includes a solid layer that is creased by a crease and that is more flexible at the crease than in another region of the layer. Each of the cases described above in this paragraph is an example of the method described in the first sentence of this paragraph, and is also an example of an embodiment of this invention that may be combined with other embodiments of this invention.

In another aspect, this invention is an apparatus comprising: (a) a first bladder, which first bladder is inflatable, such that the shape of the apparatus is adjustable by inflation or deflation of the first bladder; and (b) a second bladder that has a rigidity that is adjustable by layer jamming; wherein the first and second bladders are connected, such that inflation or deflation of the first bladder causes mechanical forces to be transmitted to the second bladder. In some cases, the apparatus further comprises one or more pumps connected by tubing to the first and second bladders. In some cases, the apparatus further comprises a solid layer that: (a) is creased by a crease; and (b) has an angle of bending at the crease, which angle is adjustable by inflation or deflation of the first bladder. Each of the cases described above in this paragraph is an example of the apparatus described in the first sentence of this paragraph, and is also an example of an embodiment of this invention that may be combined with other embodiments of this invention.

While exemplary implementations are disclosed, many other implementations will occur to one of ordinary skill in the art and are all within the scope of the invention. Each of the various embodiments described above may be combined with other described embodiments in order to provide multiple features. This invention includes not only the combination of all identified features but also includes each combination of one or more of those features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also within the scope of the present invention. Numerous modifications may be made by one of ordinary skill in the art without departing from the scope of the invention.

What is claimed is:

1. Apparatus comprising a first set of bladders and a second set of bladders, wherein:
    (a) at least one cavity exists within each respective bladder in the first and second sets of bladders, within which cavity are located
        (i) fluid, which fluid has a pressure, and
        (ii) two or more sheets, which sheets have a rigidity that is adjustable by adjustment of the pressure of the fluid; and
    (b) the first and second sets of bladders are interwoven with each other, such that:
        (i) each respective bladder in the first set of bladders (A) goes over at least two bladders in the second set of bladders and under at least one bladder in the second set of bladders, or (B) goes under at least two bladders in the second set of bladders and over at least one bladder in the second set of bladders, and
        (ii) each respective bladder in the second set of bladders (A) goes over at least two bladders in the first set of bladders and under at least one bladder in the first set of bladders, or (B) goes under at least two bladders in the first set of bladders and over at least one bladder in the first set of bladders.

2. The apparatus of claim 1, wherein the sheets, taken together, have a tensile strength in a direction, which tensile strength is adjustable by adjustment of the pressure of the fluid.

3. The apparatus of claim 1, wherein the fluid is a liquid.

4. The apparatus of claim 1, wherein the fluid is a gas.

5. The apparatus of claim 1, wherein two or more of the sheets comprise sandpaper.

6. The apparatus of claim 1, wherein, in each respective bladder, abrasive particles are bonded to a surface of each of the sheets.

7. The apparatus of claim 1, further comprising a pump system, which pump system includes:
(a) one or more pumps;
(b) tubing that connects the first set of bladders to at least one pump and connects the second set of bladders to at least one pump; and
(c) one or more valves;
wherein fluid flow within the tubing is controllable by opening or closing of the valves.

8. The apparatus of claim 7, wherein a first fluid pressure within the first set of bladders and a second fluid pressure within the second set of bladders are each separately adjustable by the pump system.

9. The apparatus of claim 7, further comprising one or more computers that are programmed to control the one or more pumps and one or more valves.

10. The apparatus of claim 1, wherein:
(a) two or more bladders, in the first set of bladders, together comprise a single integral structure; and
(b) two or more bladders, in the second set of bladders, together comprise a single integral structure.

11. The apparatus of claim 1, wherein:
(a) a portion of the first cavity is located within each bladder in the first set of bladders; and
(b) a portion of the second cavity is located within each bladder in the second set of bladders.

12. The apparatus of claim 1, wherein the apparatus further comprises one or more additional sets of bladders, each of which additional sets of bladders is interwoven with the first or second sets of bladders.

13. The apparatus of claim 1, wherein bladders are interwoven at angles, relative to each other, that are not substantially perpendicular.

14. A method that comprises using a pump system:
(a) to change a first fluid pressure of a fluid in a first bladder, and thereby to adjust stiffness of sheets that are in the first bladder by layer jamming; and
(b) to change a second fluid pressure of a fluid in a second bladder, and thereby to cause the second bladder to undergo inflation or deflation, which inflation or deflation changes the shape of the first and second bladders; wherein
(i) the first bladder is connected to the second bladder, such that inflation or deflation of the second bladder causes mechanical forces to be transmitted to the first bladder; and
(ii) the pump system comprises one or more pumps connected by tubing to the first and second set of bladders.

15. The method of claim 14, wherein:
(a) the sheets in the first bladder are stiffer when the first fluid pressure is below a first value than when the first fluid pressure is above the first value;
(b) the second bladder is less inflated when the second fluid pressure is below a second value than when the second fluid pressure is above the second value; and
(c) the method includes the steps of using the pump system
(i) to increase the second fluid pressure above the second value, while the first fluid pressure remains above the first value, thereby at least partially inflating the second bladder and causing at least a portion of the first and second bladders to undergo bending, and
(ii) then to decrease the first fluid pressure below the first value, thereby increasing the stiffness of the sheets in the first bladder.

16. The method of claim 15, further comprising an additional step that:
(a) occurs after step (c)(ii) of claim 15; and
(b) comprises using the pump system (1) to increase the first fluid pressure above the first value, thereby decreasing the stiffness of the sheets in the first bladder, and (2) to decrease the second fluid pressure below the second value, thereby at least partially deflating the second bladder.

17. The method of claim 14, wherein the device includes a solid layer that is creased by a crease and that is more flexible at the crease than in another region of the layer.

18. Apparatus comprising:
(a) a first bladder, which first bladder is inflatable, such that the shape of the apparatus is adjustable by inflation or deflation of the first bladder; and
(b) a second bladder that has a rigidity that is adjustable by layer jamming;
wherein the first and second bladders are connected, such that inflation or deflation of the first bladder causes mechanical forces to be transmitted to the second bladder.

19. The apparatus of claim 18, further comprising one or more pumps connected by tubing to the first and second bladders.

20. The apparatus of claim 18, further comprising a solid layer that:
(a) is creased by a crease; and
(b) has an angle of bending at the crease, which angle is adjustable by inflation or deflation of the first bladder.

* * * * *